United States Patent
Little et al.

(10) Patent No.: US 9,804,342 B2
(45) Date of Patent: *Oct. 31, 2017

(54) HYBRID CONNECTOR FOR BOTH ELECTRICAL AND OPTICAL TRANSMISSION

(71) Applicant: FOXCONN INTERCONNECT TECHNOLOGY LIMITED, Grand Cayman (KY)

(72) Inventors: Terrance F. Little, Fullerton, CA (US); Yuan Zhang, Rowland-Heights, CA (US)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/083,315

(22) Filed: Mar. 29, 2016

(65) Prior Publication Data
US 2016/0282566 A1 Sep. 29, 2016

Related U.S. Application Data

(63) Continuation-in-part of application No. 15/080,613, filed on Mar. 25, 2016.

(60) Provisional application No. 62/141,259, filed on Mar. 31, 2015, provisional application No. 62/137,829, filed on Mar. 25, 2015.

(51) Int. Cl.
*G02B 6/36* (2006.01)
*G02B 6/38* (2006.01)
*H01R 24/64* (2011.01)
*H01R 13/506* (2006.01)

(52) U.S. Cl.
CPC ......... *G02B 6/3855* (2013.01); *G02B 6/3817* (2013.01); *G02B 6/3879* (2013.01); *H01R 13/506* (2013.01); *H01R 24/64* (2013.01); *G02B 6/3885* (2013.01); *G02B 6/3893* (2013.01)

(58) Field of Classification Search
CPC .. G02B 6/3887; G02B 6/3869; G02B 6/3821; G02B 6/3893; G02B 6/3885; G02B 6/36
See application file for complete search history.

(56) References Cited

U.S. PATENT DOCUMENTS

| 5,896,480 | A | 4/1999 | Scharf et al. |
| 7,326,087 | B2 | 2/2008 | Gerlach et al. |
| 7,648,288 | B2 * | 1/2010 | Nagura ................ G02B 6/4292 385/88 |

(Continued)

*Primary Examiner* — Jennifer Doan
(74) *Attorney, Agent, or Firm* — Wei Te Chung; Ming Chieh Chang

(57) ABSTRACT

A hybrid plug connector including an insulative housing defining a cavity to receive an optical fiber assembly therein, and a plurality of passageways to receive a plurality of terminals therein. A printed circuit board is located behind the terminals and connected to the terminals. An electrical cable is mounted to a rear portion of the circuit board. The whole optical fiber assembly is received within the housing and is somewhat back and forth moveable along a front-to-back direction for buffering for compliantly coupling with another optical fiber assembly built within the complementary receptacle connector when the plug connector is inserted into the complementary receptacle connector. An attachment shows the manufacturing process.

20 Claims, 34 Drawing Sheets

(56) References Cited

U.S. PATENT DOCUMENTS

| | | | | |
|---|---|---|---|---|
| 7,677,813 B2* | 3/2010 | Anrig | .................. | G02B 6/3813 |
| | | | | 385/39 |
| 8,708,754 B2 | 4/2014 | Su et al. | | |
| 2011/0243505 A1 | 10/2011 | Su et al. | | |
| 2012/0314999 A1 | 12/2012 | Wu | | |
| 2016/0282564 A1* | 9/2016 | Little | .................. | G02B 6/3817 |

* cited by examiner

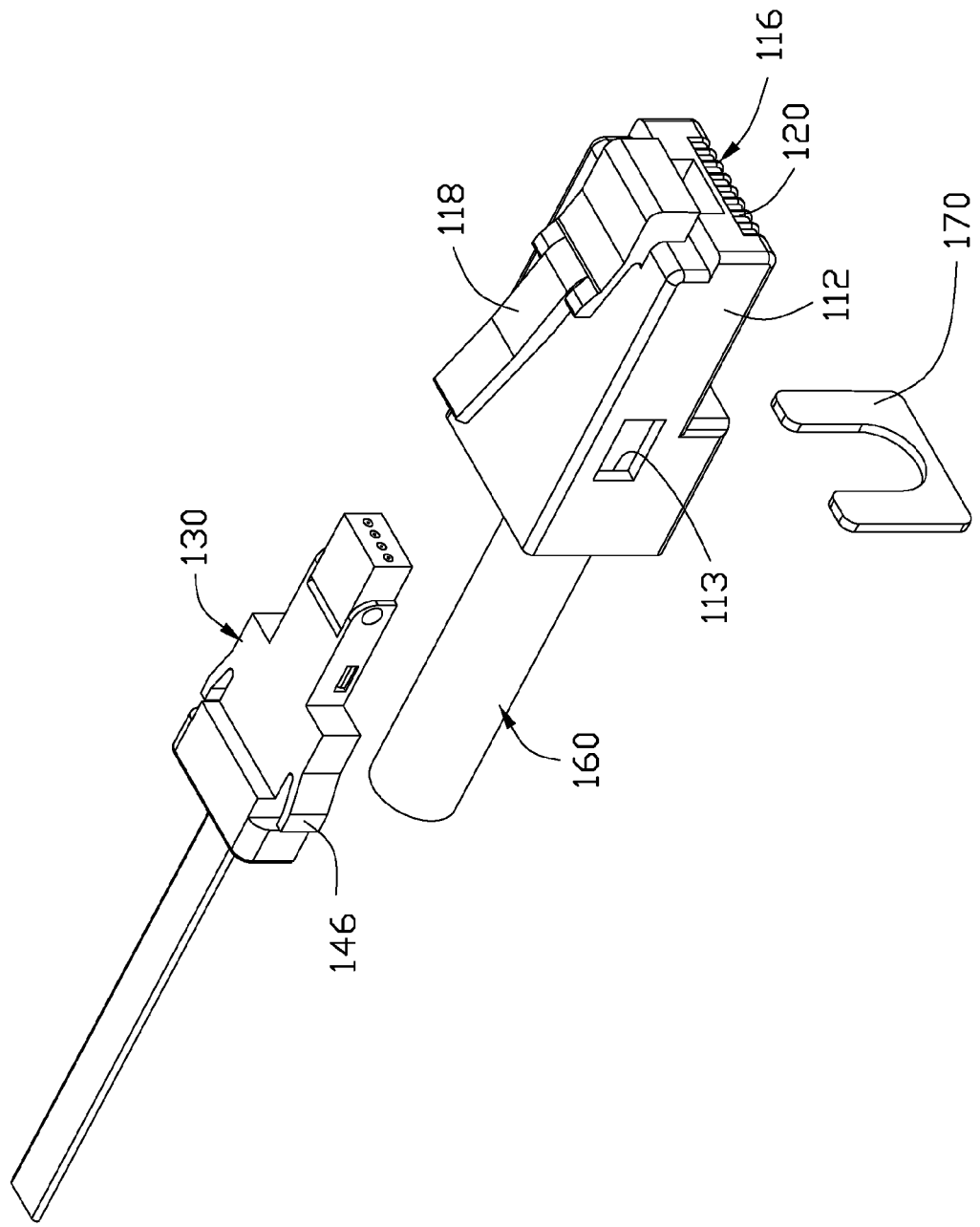

HYBRID CONNECTOR FOR BOTH ELECTRICAL AND OPTICAL TRANSMISSION

This application claims the benefit of, and priority to U.S. Provisional Patent Application No. 62/137,829 filed 03/25/2015 and No. 62/141,259, filed Mar. 31, 2015, the contents of which are incorporated entirely herein by reference.

BACKGROUND OF THE INVENTION

1. Field of the Invention

The present invention relates to a hybrid connector, and more particularly to a connector with the RJ45 configuration while further equipped with MPO (Multi-fiber Push On) device therewith so as to transmit both electrical and optical signals therein.

2. Description of Related Art

U.S. Pat. No. 7,326,087 discloses a hybrid connector with the regular RJ45 configuration. The hybrid connector has an insulative housing and two light transmission conductors mounted between a deflectable latch and a plurality of passageways formed on two opposite sides of the housing.

U.S. Pat. No. 8,708,754 discloses a hybrid connector with the regular RJ45 configuration to transmit both electrical and optical signals. Anyhow, only two optic fibers are available in such a design and no resilient force is provided for assuring coupling between the coupled optical fibers of the mated plug connector and the RJ connector. Therefore, a hybrid connector having the regular RJ45 configuration and further equipped with the MPO device for both electrical and optical transmission is desired.

SUMMARY OF THE INVENTION

Accordingly, the object of the present invention is to provide a hybrid plug connector including an insulative housing defining a cavity to receive an optical fiber assembly therein, and a plurality of passageways to receive a plurality of terminals therein. A printed circuit board is located behind the terminals and connected to the terminals. An electrical cable is mounted to a rear portion of the circuit board. The optical fiber assembly includes a base block with a plurality of upward grooves therein. A cap is pivotally mounted to the base block with a pair of resilient latches on two lateral sides and with a plurality of downward grooves aligned with the corresponding upward grooves in a vertical direction, respectively, so as to cooperate with such upward grooves to commonly form a plurality of through holes after the cap is fastened to the base block. A plurality of ferrules are retained in the corresponding through holes, respectively. A plurality of optical fibers are retained within the corresponding ferrules, respectively. The whole optical fiber assembly is received within the housing and is somewhat back and forth moveable along a front-to-back direction for buffering for compliantly coupling with another optical fiber assembly built within the complementary receptacle connector when the plug connector is inserted into the complementary receptacle connector.

Another object of the invention is to provide the individual ferrule and the associated optical fiber with buffering instead of the whole optical fiber assembly so as to have the self-adjustment for each individual optical fiber during coupling to the complementary receptacle connector.

Other objects, advantages and novel features of the invention will become more apparent from the following detailed description when taken in conjunction with the accompanying drawings.

BRIEF DESCRIPTION OF THE DRAWINGS

FIG. 14(A) is a front exploded perspective view of the plug connector of FIG. 13 with the optical fiber assembly removed therefrom further.

DETAILED DESCRIPTION OF THE PREFERRED EMBODIMENT

Figure 1:
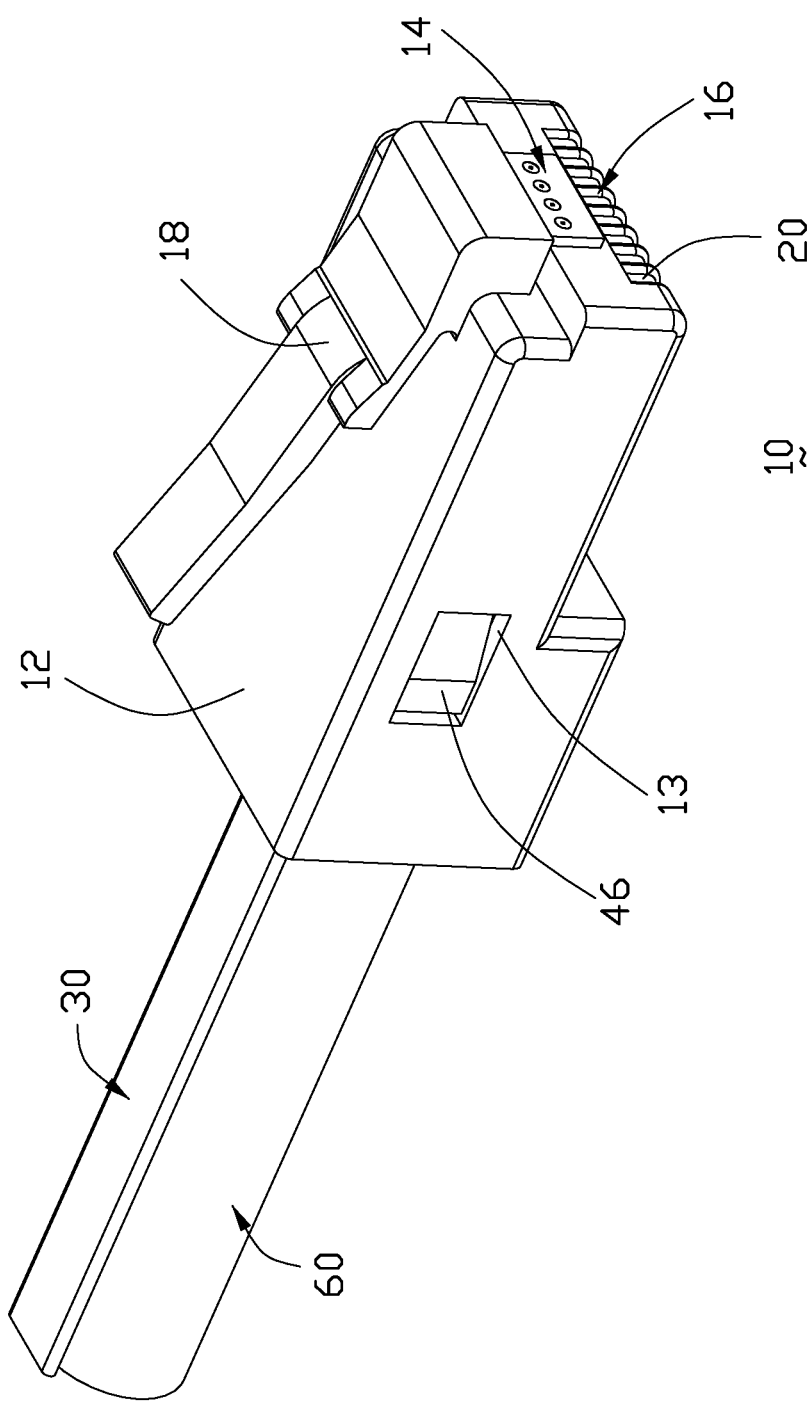
FIG. 1 is a front perspective view of the plug connector according to a first embodiment of the invention.
Figure 2:
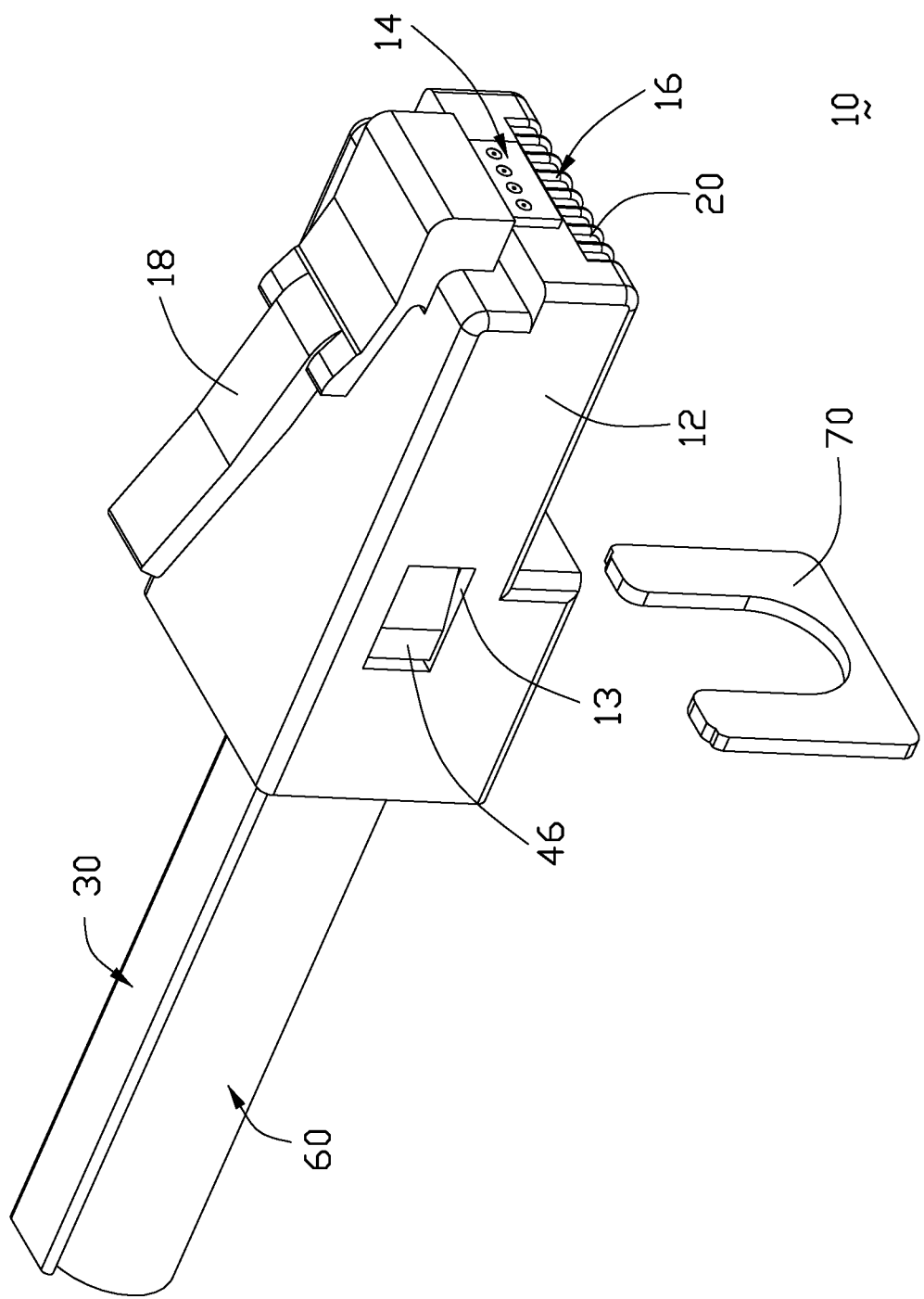
FIG. 2 is a front exploded perspective view of the plug connector of FIG. 1 with the retention clip removed therefrom.
Figure 3A:
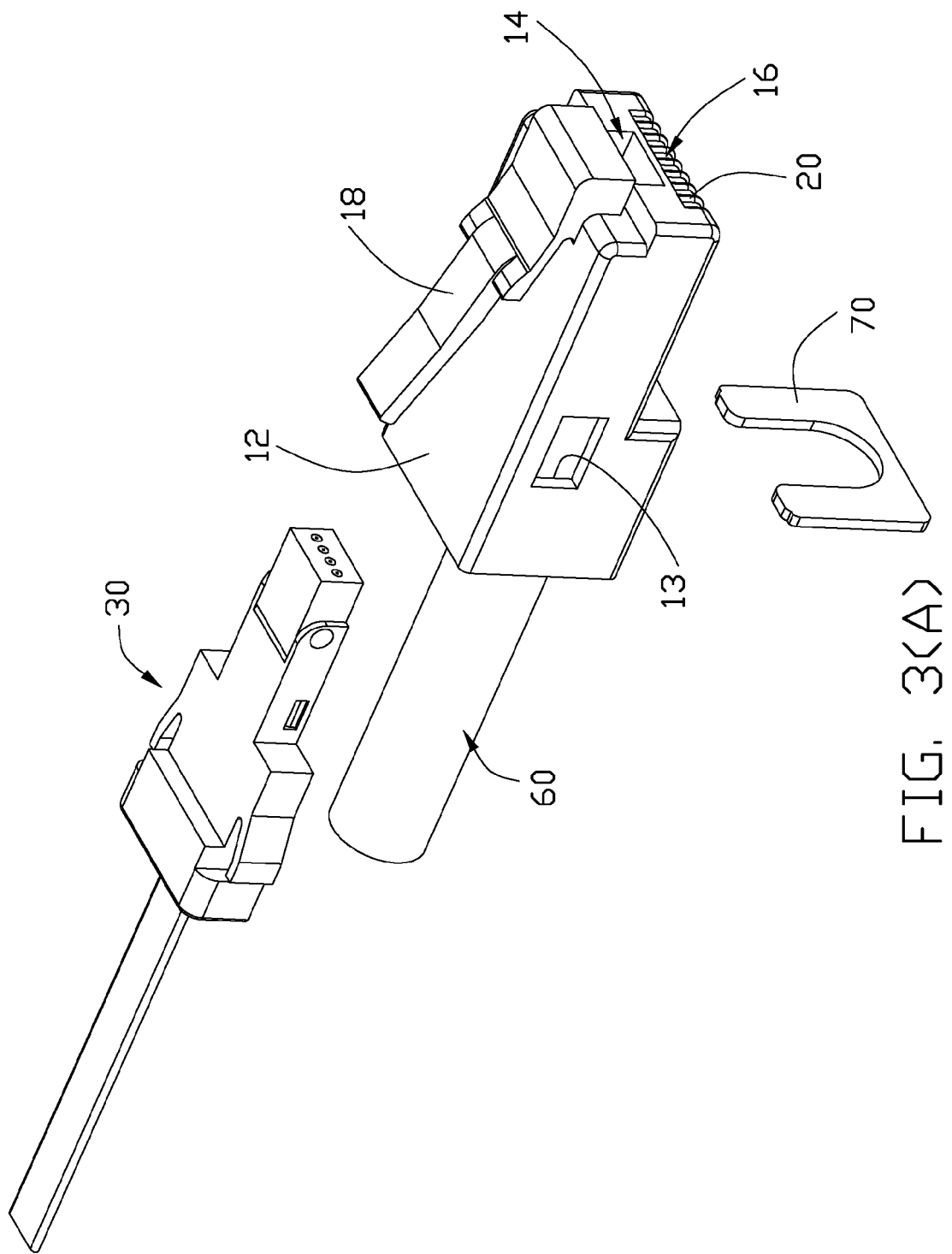
FIG. 3(A) is a front exploded perspective view of the plug connector of FIG. 2 with the optical fiber assembly removed therefrom further.
Figure 3B:
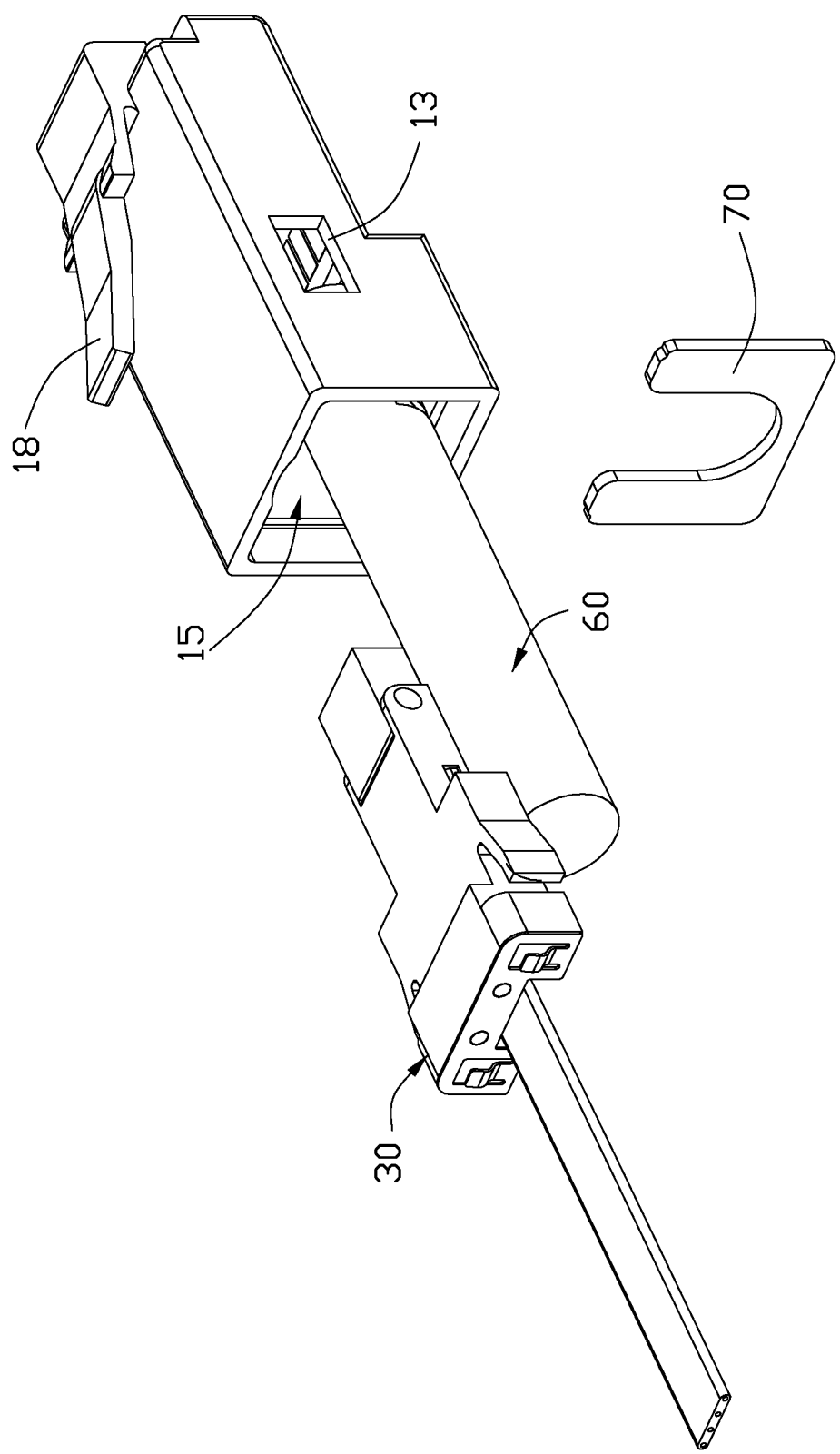
FIG. 3(B) is a rear exploded perspective view of the plug connector of FIG. 3(A).
Figure 4A:
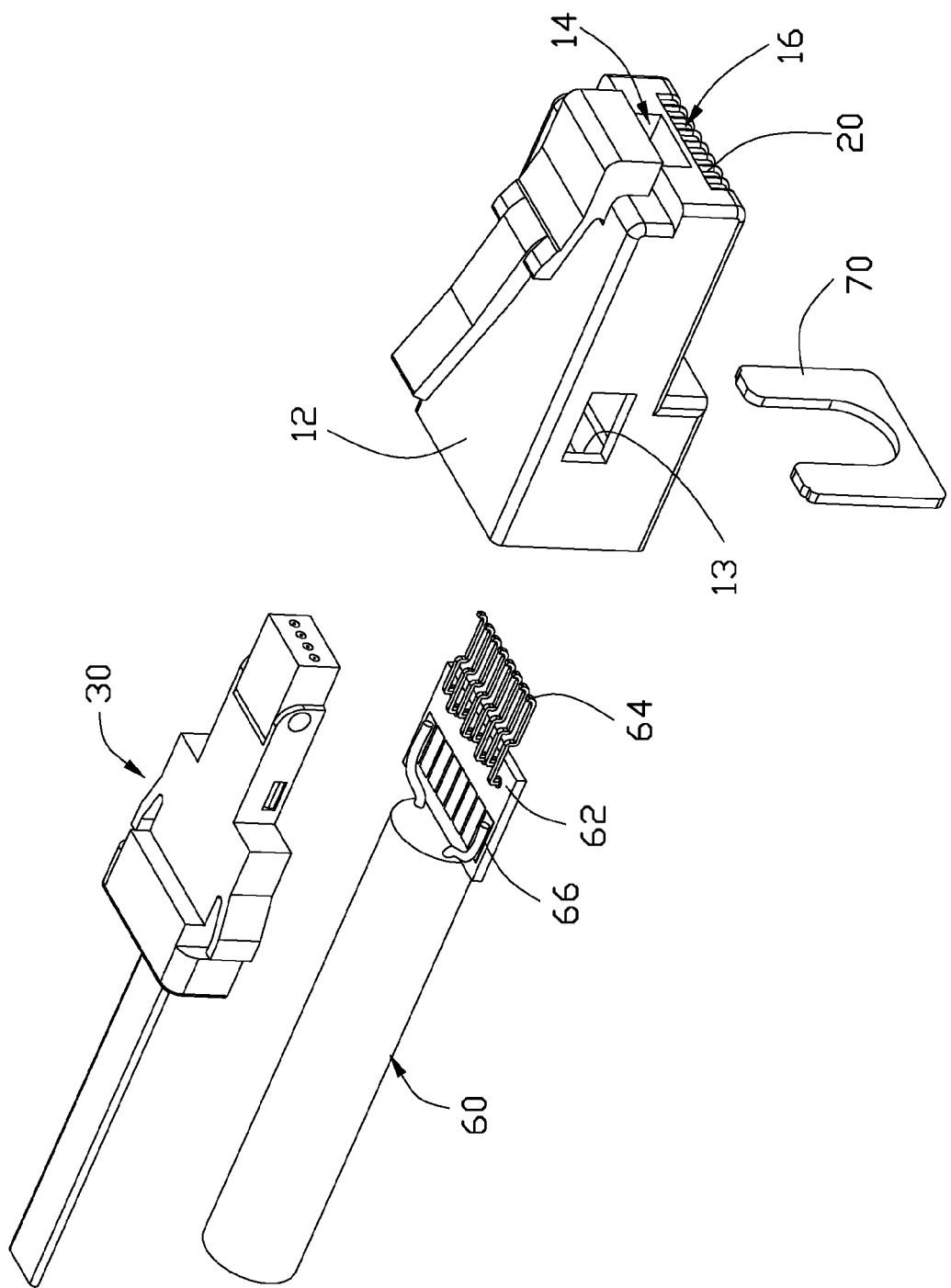
FIG. 4(A) is a further front exploded perspective view of the plug connector of FIG. 3(A) to expose the electrical contact assembly.
Figure 4B:
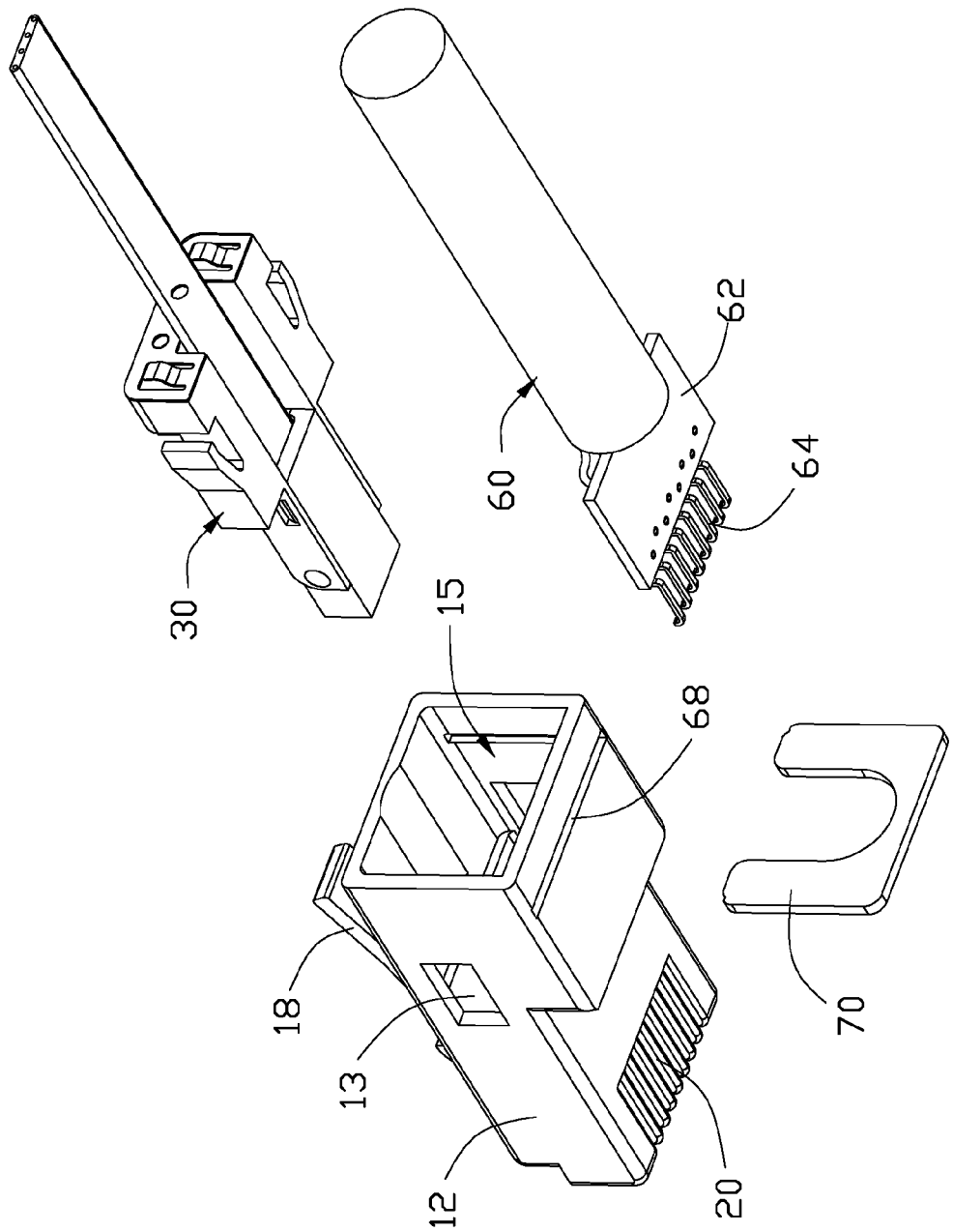
FIG. 4(B) is a further rear exploded perspective view of the receptacle connector of FIG. 3(B).
Figure 5:
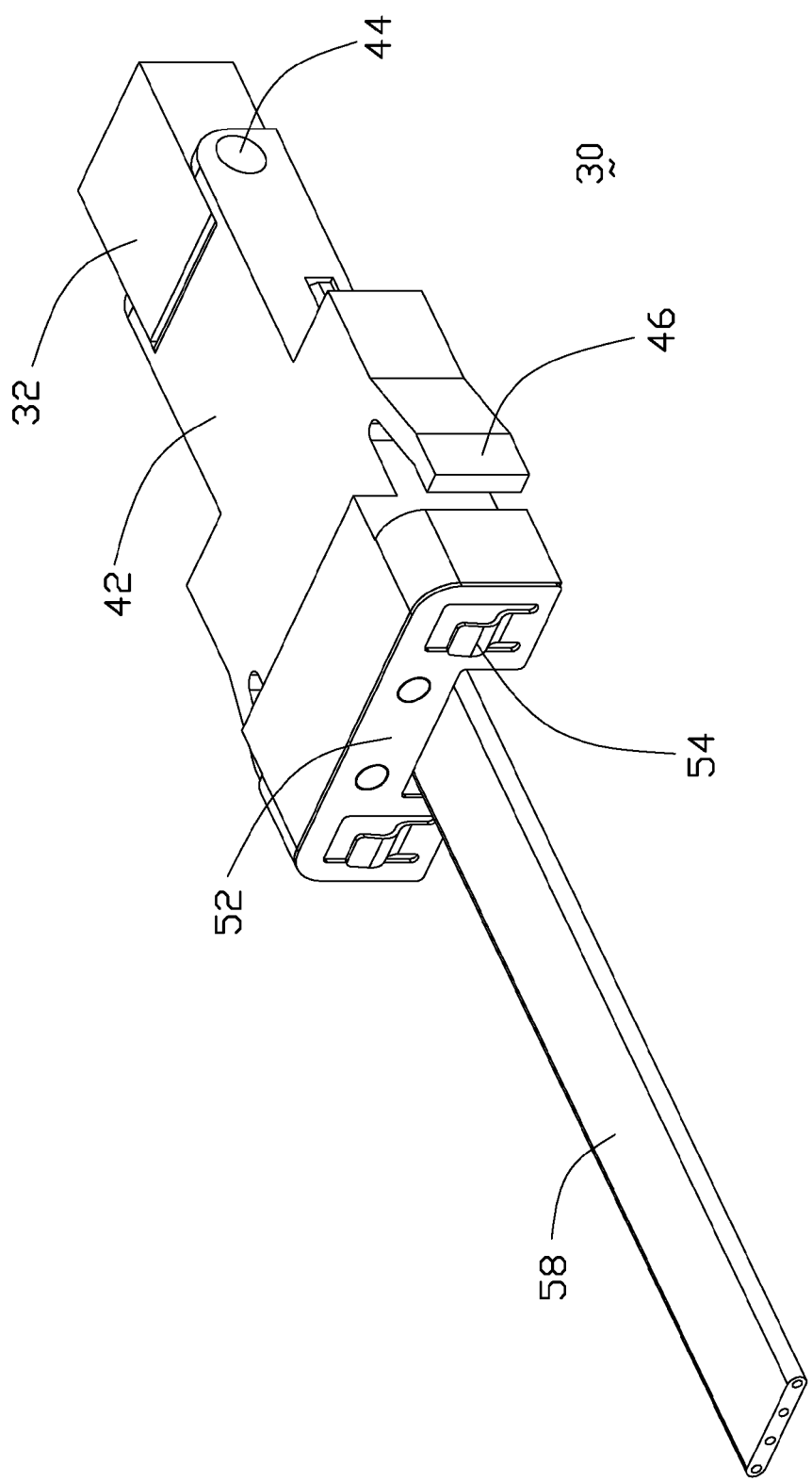
FIG. 5 is a rear perspective view of the optical fiber assembly of the plug connector of FIG. 4.
Figure 6A:
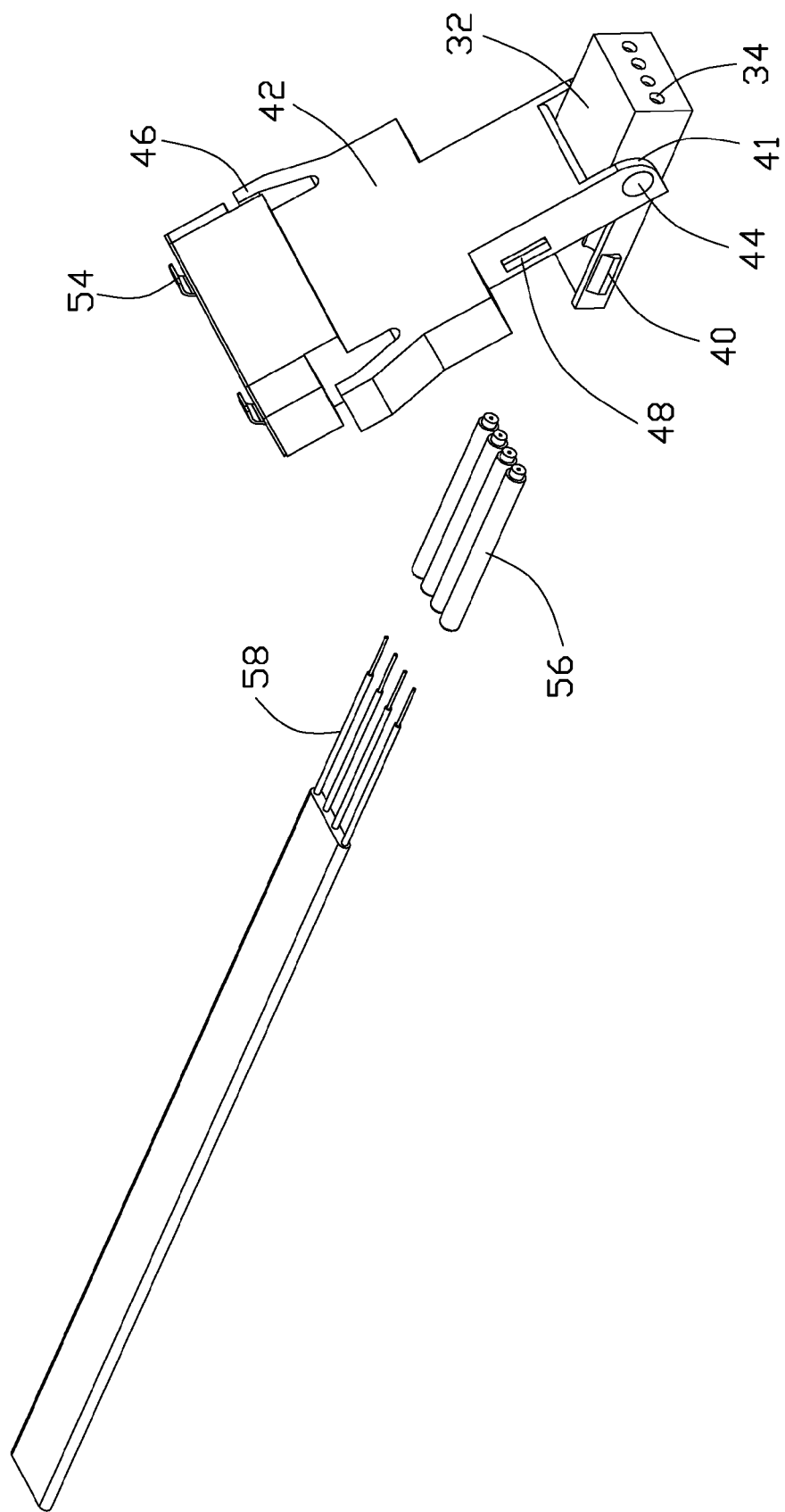
FIG. 6(A) is a front exploded perspective view of the optical fiber assembly of FIG. 5.
Figure 6B:
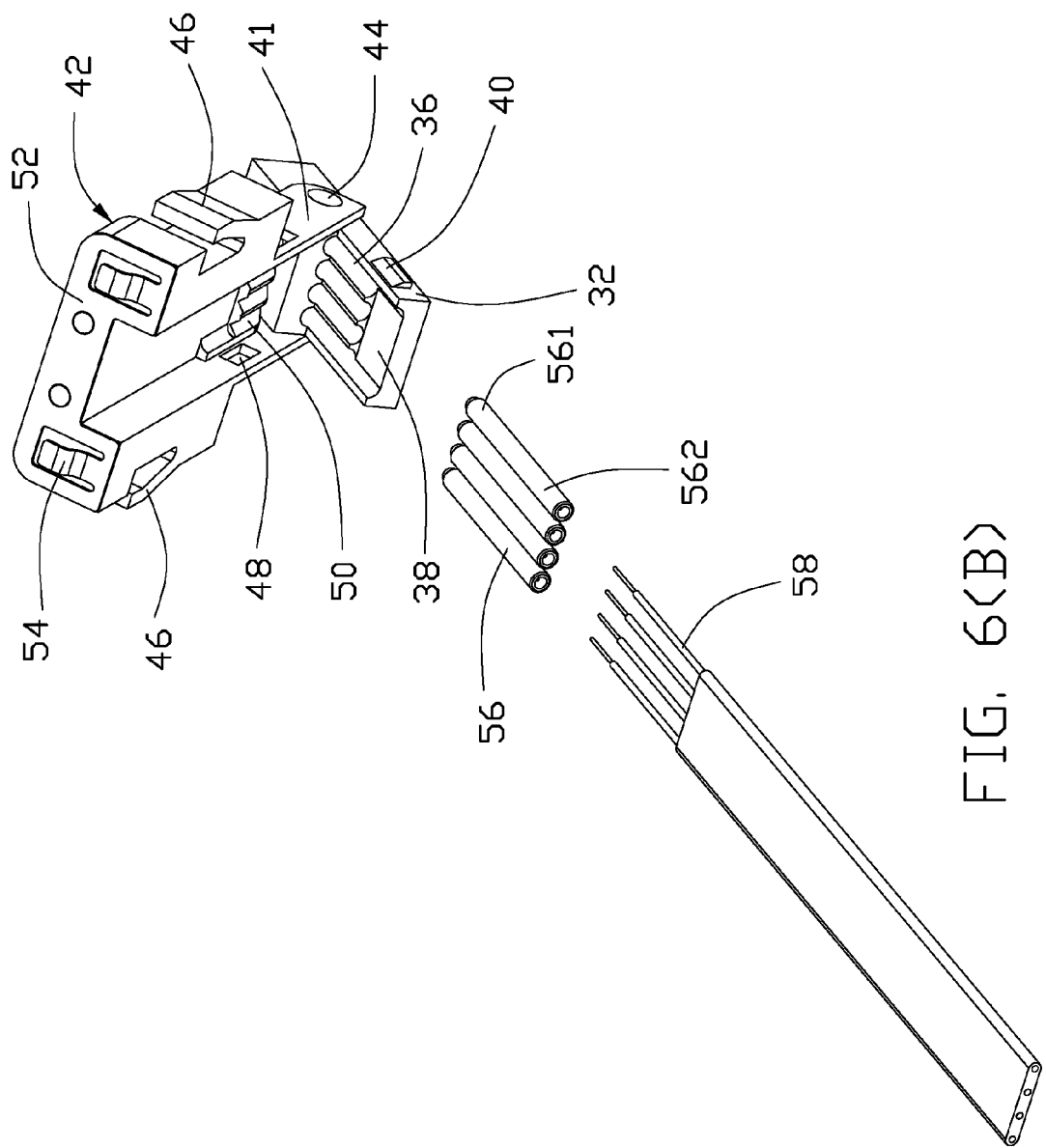
FIG. 6(B) is a rear exploded perspective view of the optical fiber assembly of FIG. 5.
Figure 7:
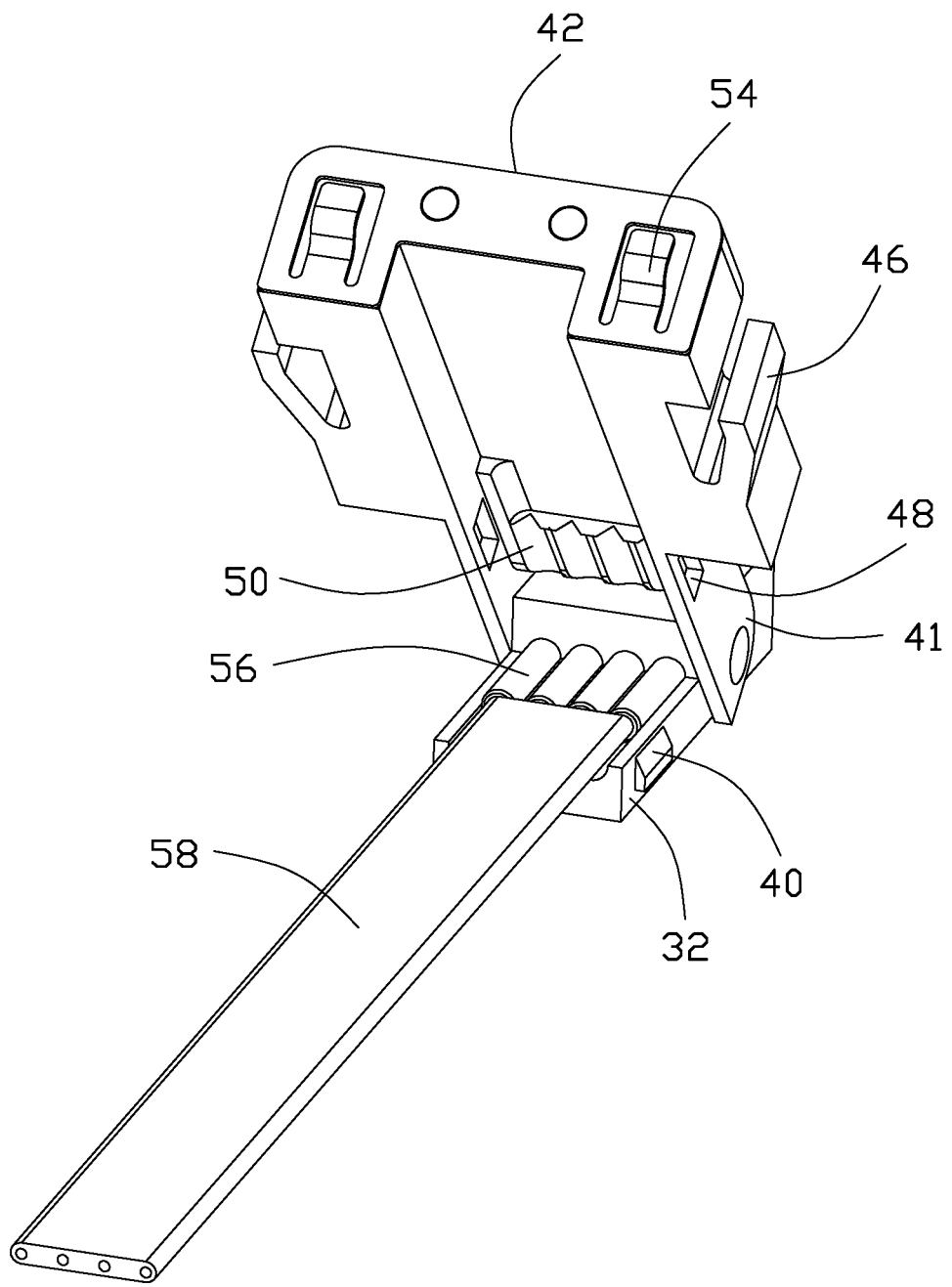
FIG. 7 is a rear perspective view of the optical fiber assembly of FIG. 5 with the cap is pivotally moved away from the base block.
Figure 8:
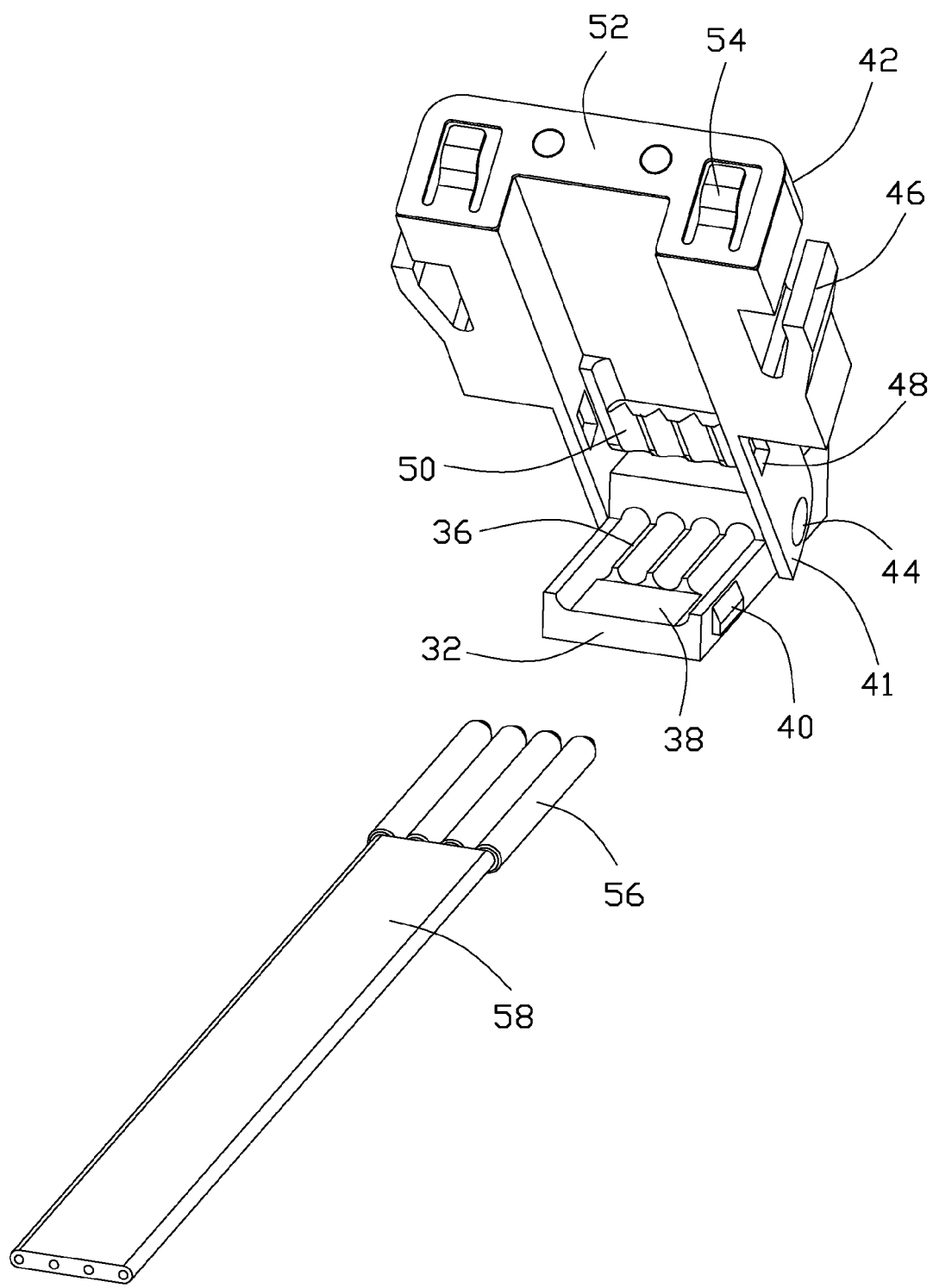
FIG. 8 is a rear exploded perspective view of the optical fiber assembly of FIG. 7.

Reference will now be made in detail to the preferred embodiment of the present invention.

FIGS. 1-11 show a plug connector 10 of the first embodiment for mating with a receptacle connector. The plug connector 10 includes an insulative housing 12 forming an optical mating port 14 and an electrical mating port 16 stacked with each other in a vertical direction. A receiving cavity 15 is formed in the housing 12 and communicates with the optical mating port 14 and the electrical mating port 16. A resilient latch 18 is unitarily formed on the housing 12 beside the optical mating port 14 and opposite to the electrical mating port 16 in the vertical direction. A plurality of passageways 20 extending along a front-to-back direction, are formed in the housing 12 around the electrical mating port 16. The contour of the housing 12 is compliant with the RJ-45 receptacle connector.

An optical fiber assembly 30 includes a base block 32 forming a plurality of through hole 34 extending along the front-to-back direction therein and a plurality of grooves 36 located behind and communicatively aligned with the corresponding through holes 34. A raised platform 38 is located behind the grooves 36. A pair of locking pegs 40 are formed on two opposite lateral sides of the base block 32. A cap 42 is pivotally mounted to the base block 32 and rotatable about the pivotal axis 44. A pair of deflectable latches 46 are formed on two opposite lateral sides of the cap 42 for locking into the corresponding locking openings 13 in the housing 12. A pair of locking holes 48 are formed within two opposite lateral sides for engagement with the locking pegs 40 of the base block 32. A pressing protrusion 50 is formed on an interior surface of the cap 42 for cooperating with platform 38 to forwardly, in the front-to-back direction, abut against a rear ends of the corresponding ferrules 56 which receive the corresponding optical fibers 58 therein. (illustrated later). A metallic plate 52 is attached to a rear end face of the cap 42 with a pair of kicker springs 54 thereon.

Figure 9:
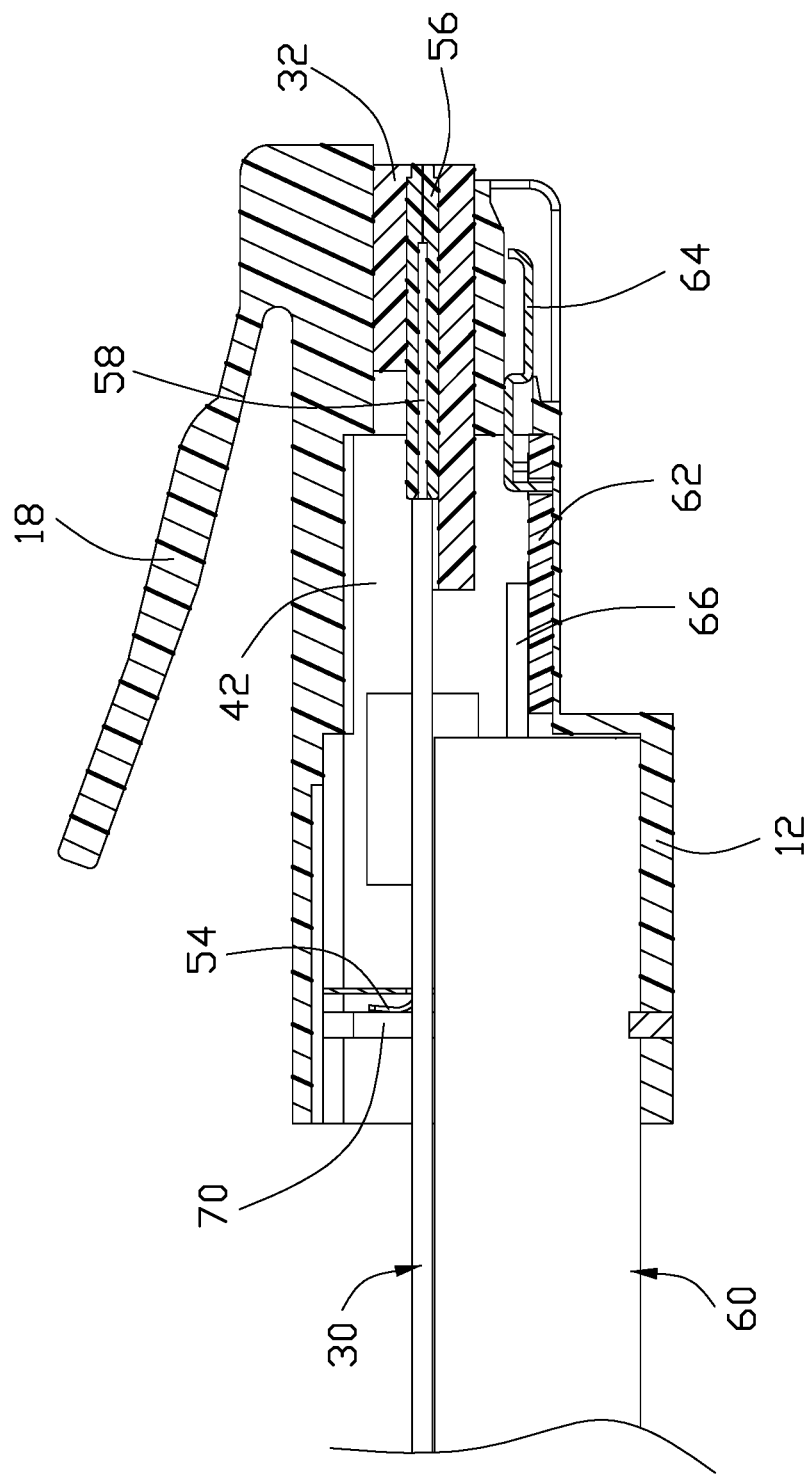
FIG. 9 is a vertical cross-sectional view of the plug connector of FIG. 1.
Figure 10:
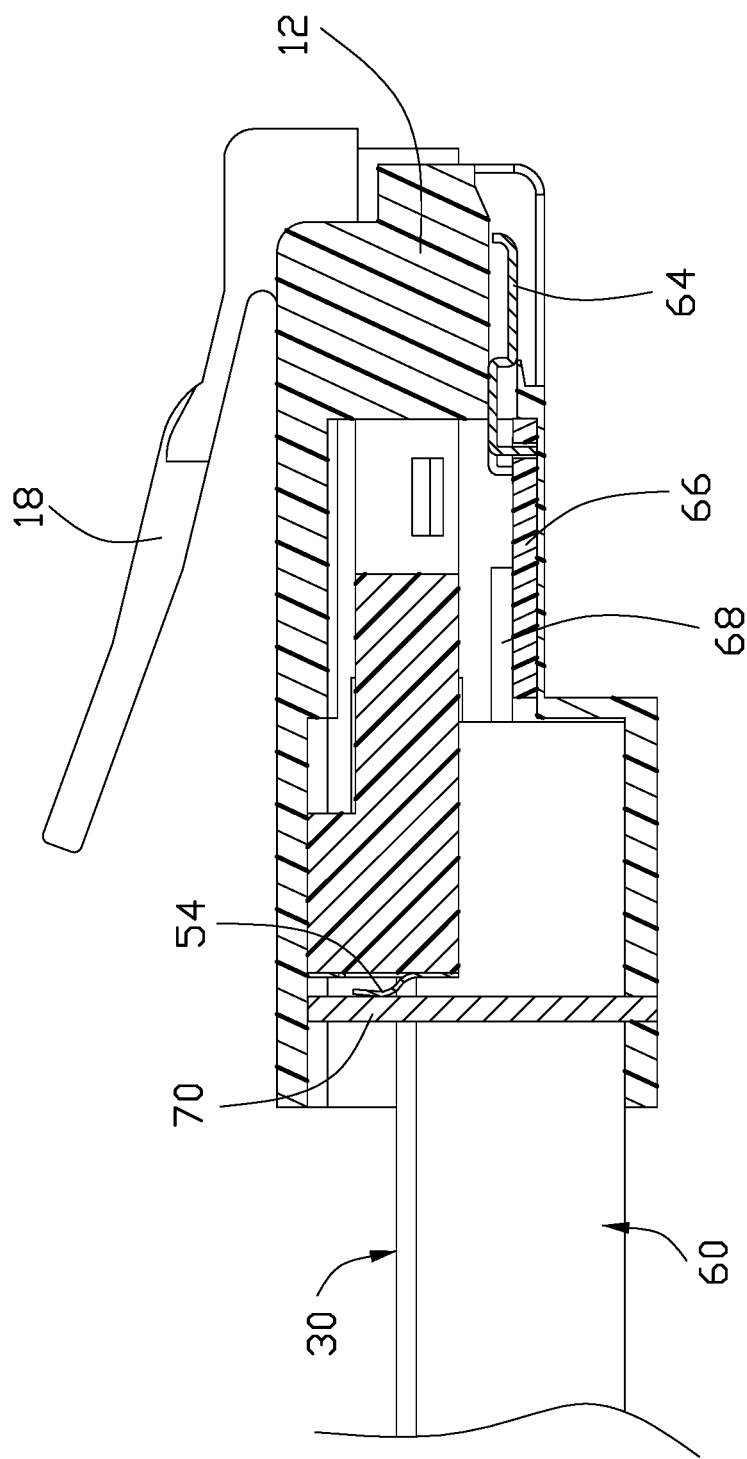
FIG. 10 is another vertical cross-sectional view of the plug connector of FIG. 1

A plurality of ferrules 56 are side by side arranged with one another in a transverse direction wherein each ferrule 56 has a front half portion 561 received within the corresponding through hole 34 while a rear half portion 562 received within the corresponding groove 36. Notably, as shown in FIG. 9, a shoulder structure is formed at a front end portion of each through hole 34 to comply with the similar structure formed on a tip portion of the corresponding ferrule 56 so as to prevent forward movement of the ferrule 56. On the other hand, the rear end of each ferrule 56 abuts rearwardly against the platform 38 and the protrusion 50 in the front-to-back direction so as to prevent rearward movement of the ferrule 56. Therefore, the ferrule 56 is retained in the base block 32 in position without relative movement therebetween in the front-to-back direction. A plurality of optical fibers 58 are inserted into the corresponding ferrules 56, respectively, and further fixed thereto without relative movement therebetween in the front-to-back direction wherein the front tip of the optical fiber 58 is essentially flush with a front tip of the corresponding ferrule 56.

An electrical assembly 60 is located below the optical fiber assembly 30 in the vertical direction and includes a printed circuit board 62 with a plurality of terminals 64 connected to a front region and a plurality of wires 66 connected to the rear region. A retaining clip 70 is adapted to be inserted into a corresponding slot 68 in the housing 12 along the vertical direction.

Figure 11:
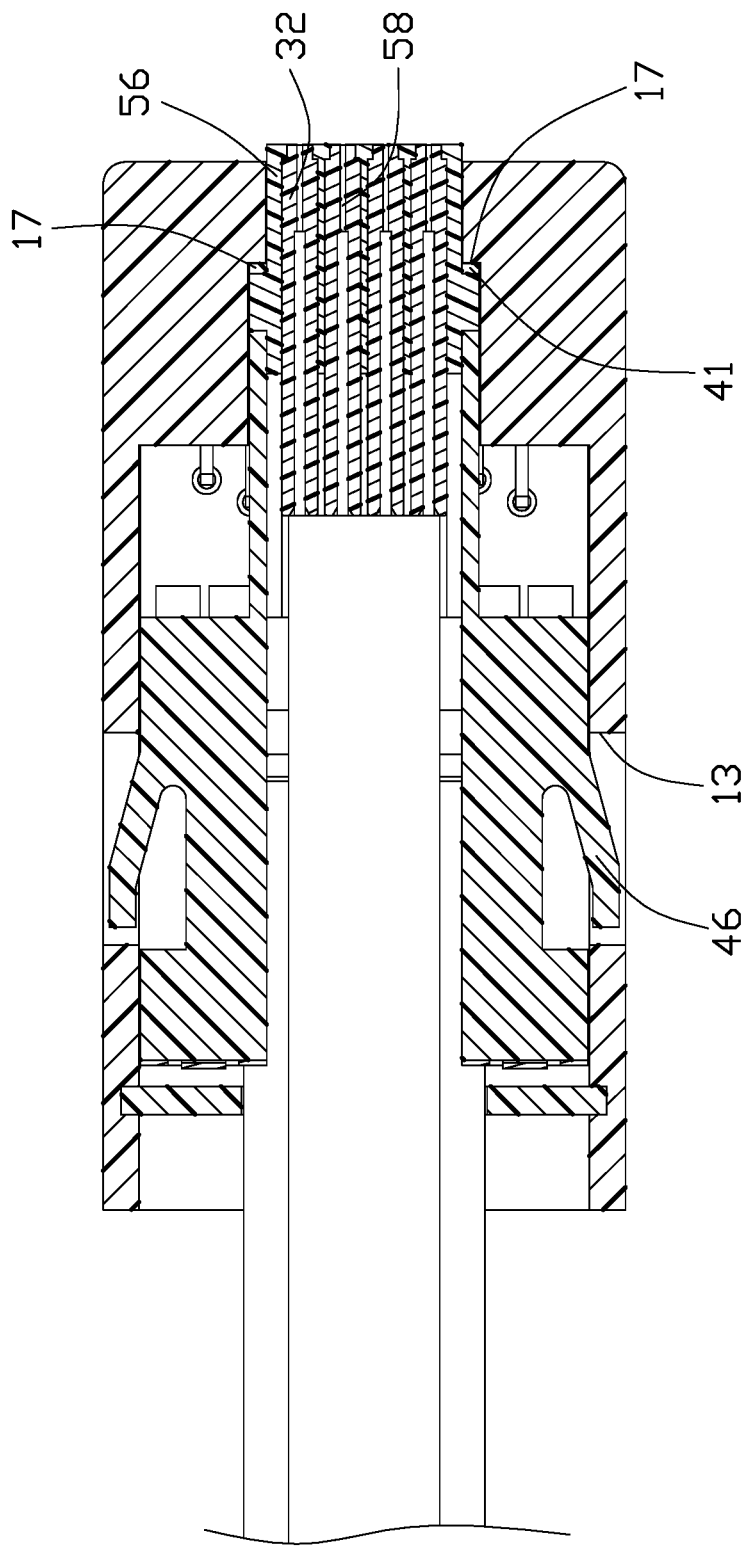
FIG. 11 is a horizontal cross-sectional view of the optical fiber assembly of FIG. 1.
Figure 12:
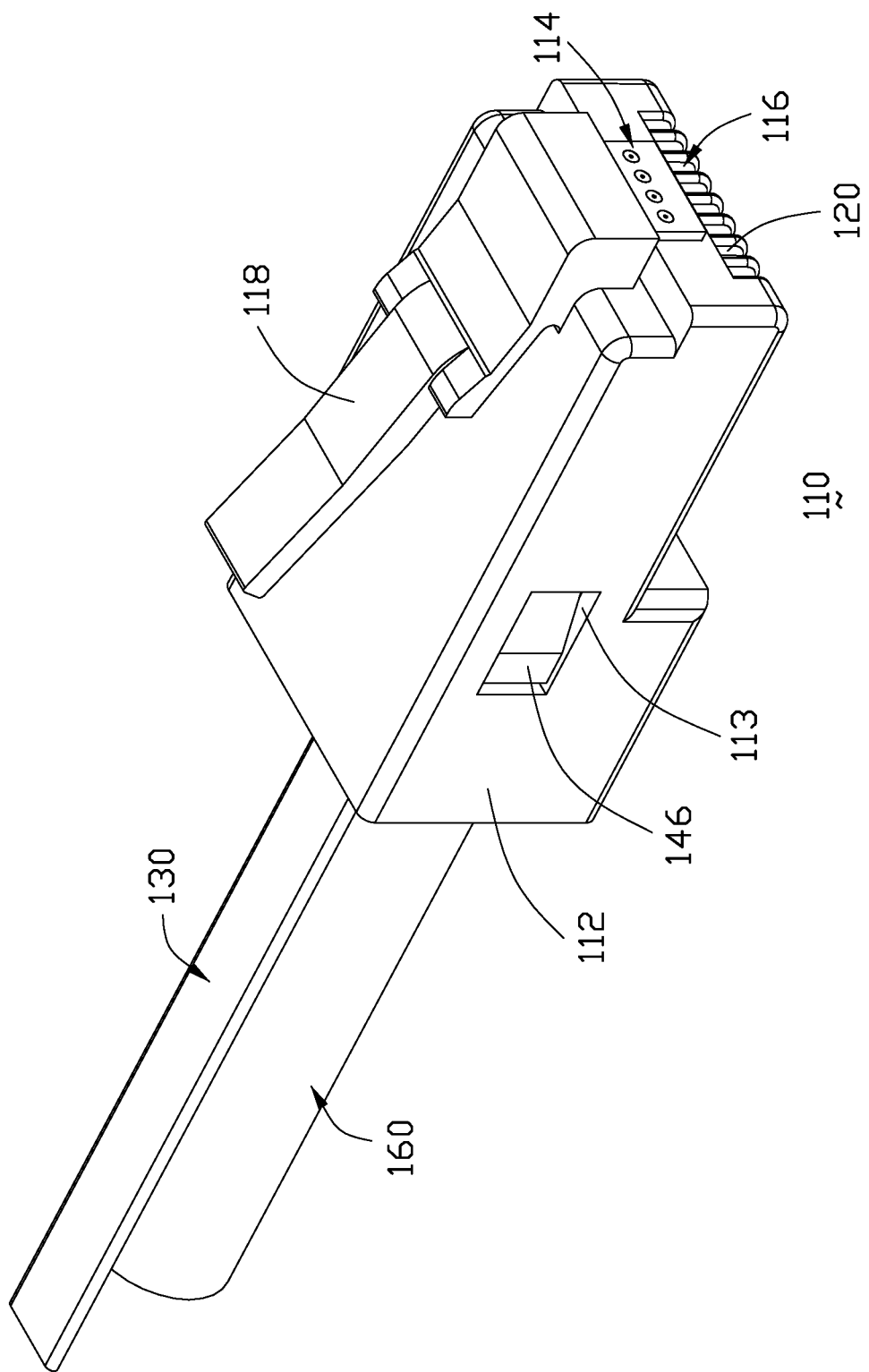
FIG. 12 is a front perspective view of the plug connector according to a second embodiment of the invention.
Figure 13:
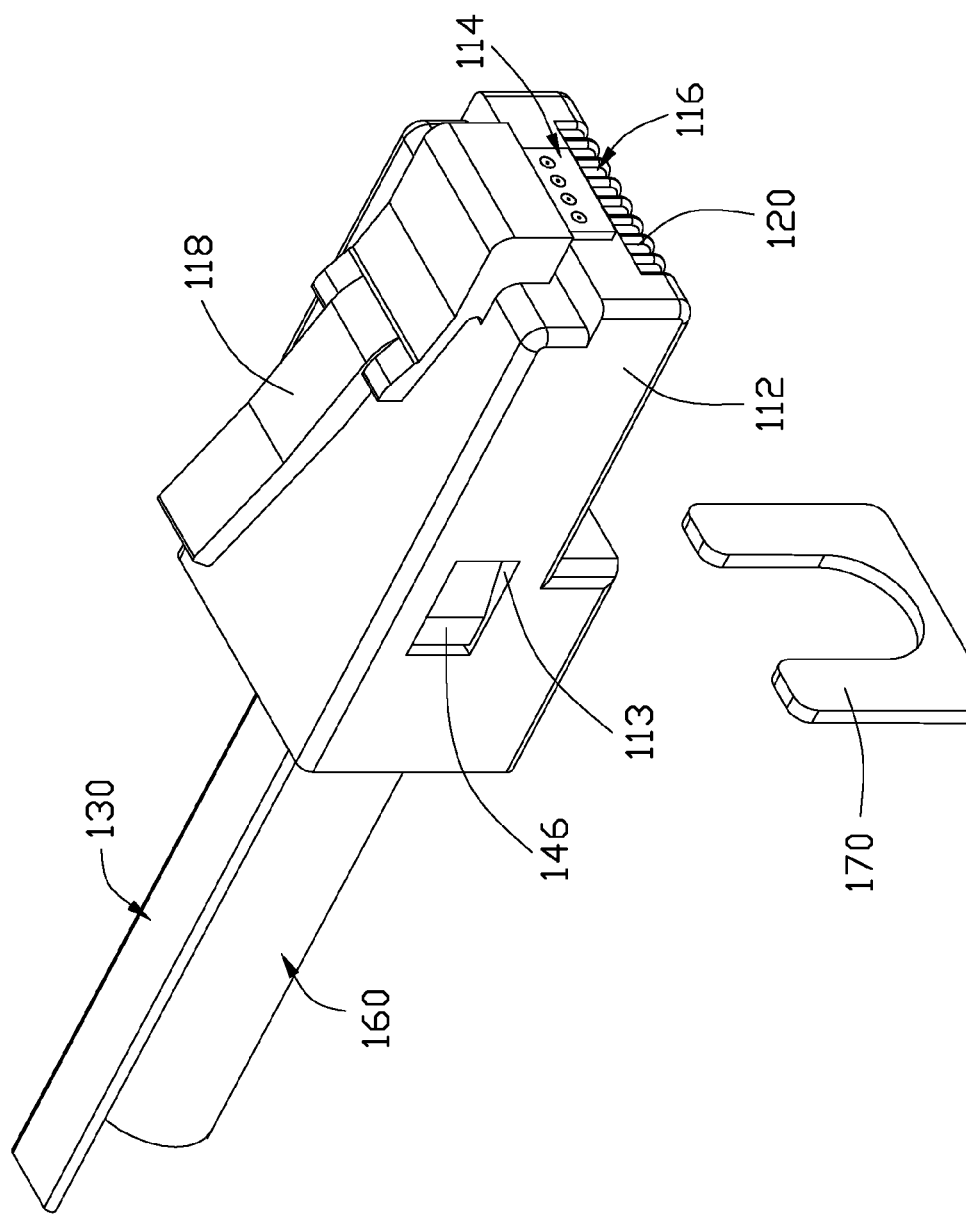
FIG. 13 is a front exploded perspective view of the plug connector of FIG. 12 with the retention clip removed therefrom.
Figure 14B:
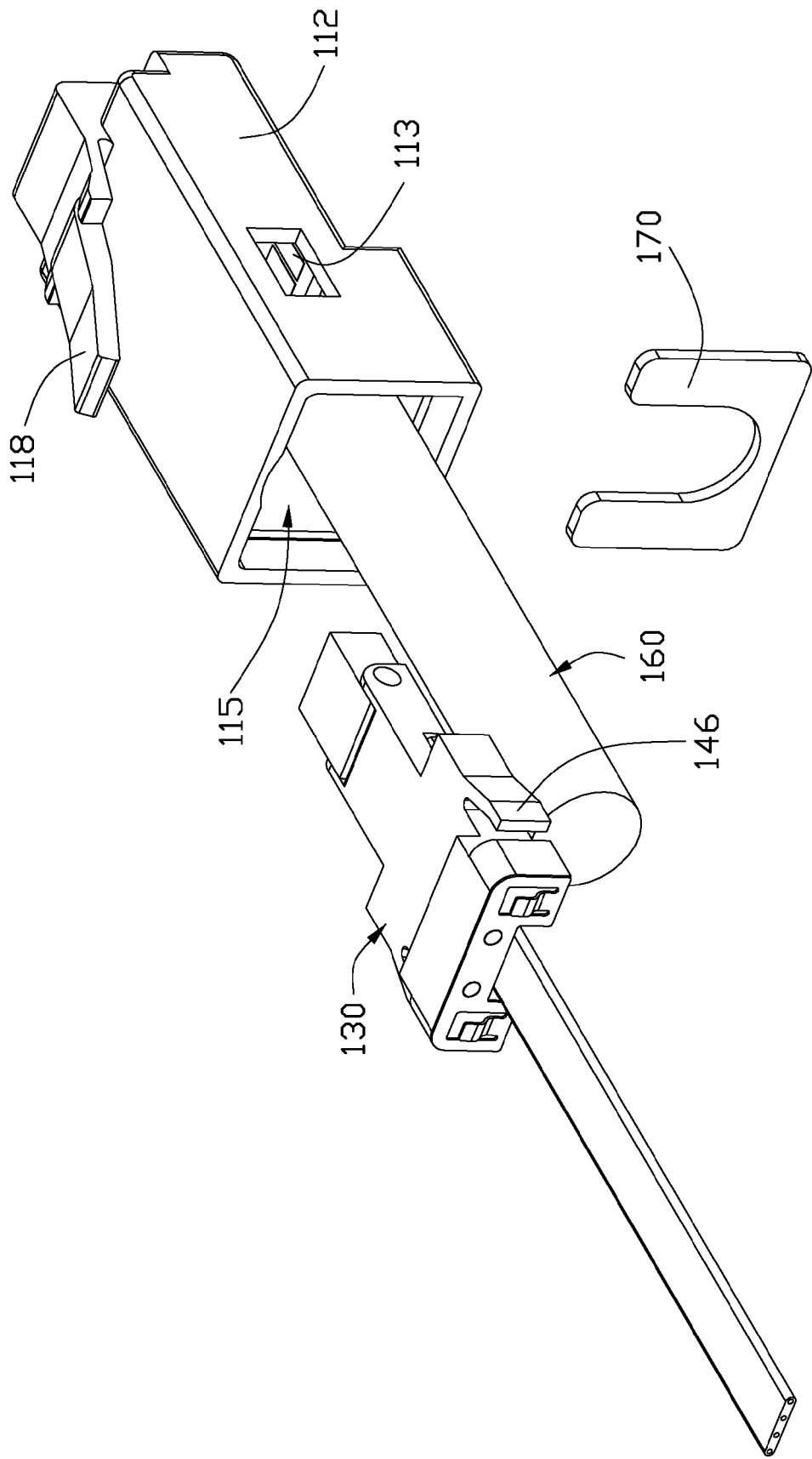
FIG. 14(B) is a rear exploded perspective view of the plug connector of FIG. 13.
Figure 15A:
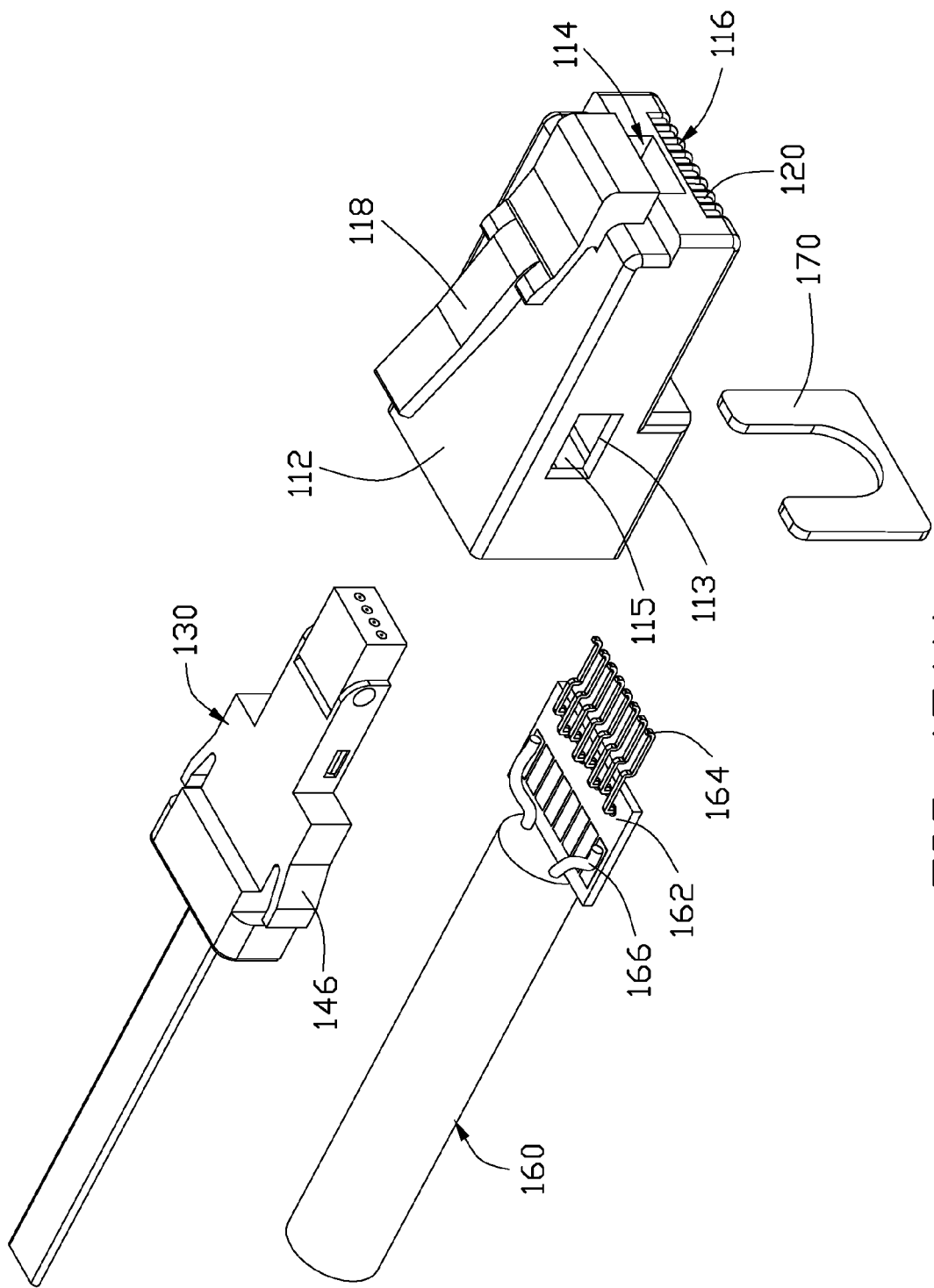
FIG. 15(A) is a further front exploded perspective view of the plug connector of FIG. 14(A) to expose the electrical contact assembly.
Figure 15B:
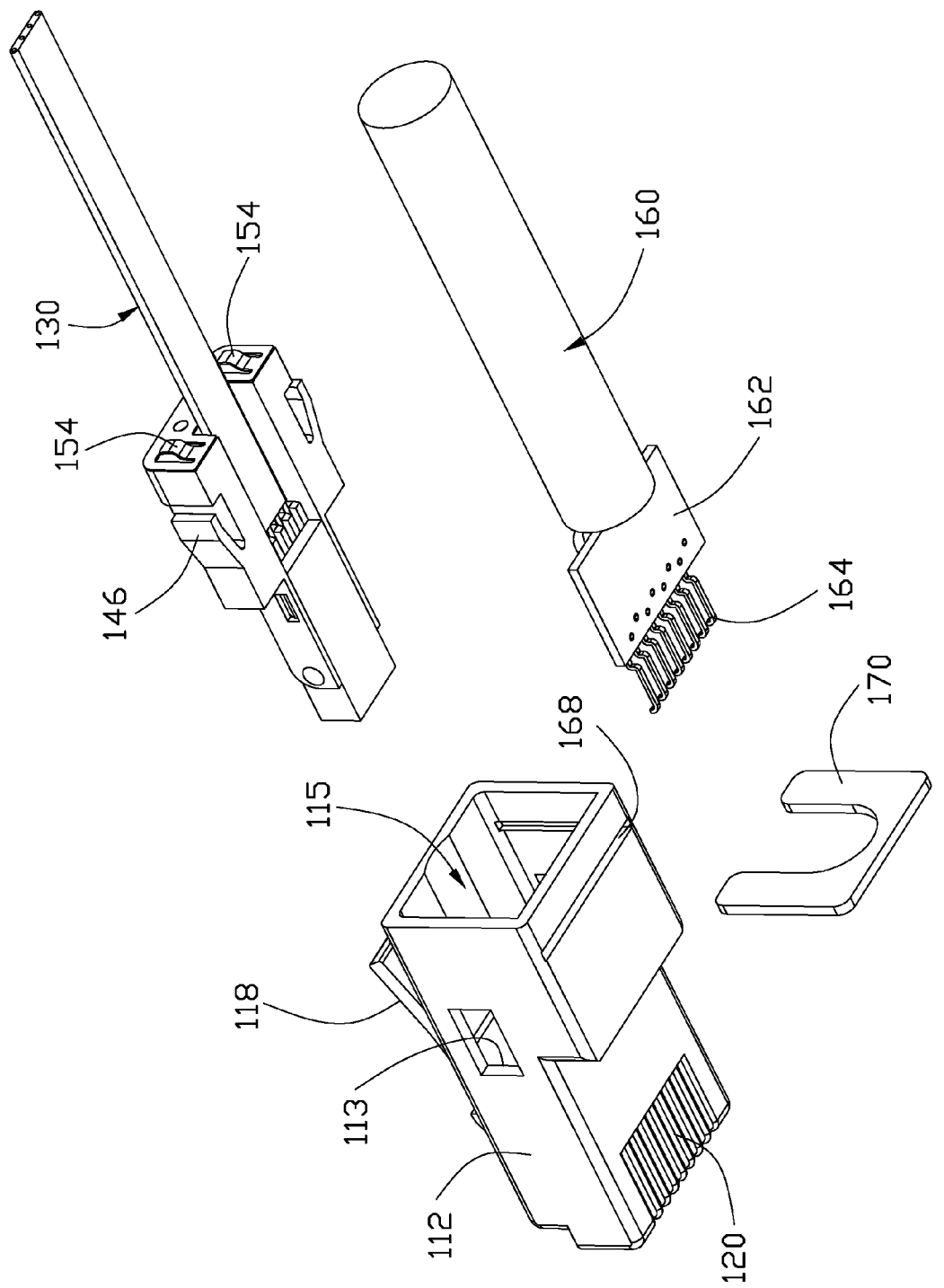
FIG. 15(B) is a further rear exploded perspective view of the plug connector of FIG. 14 (B).
Figure 16:
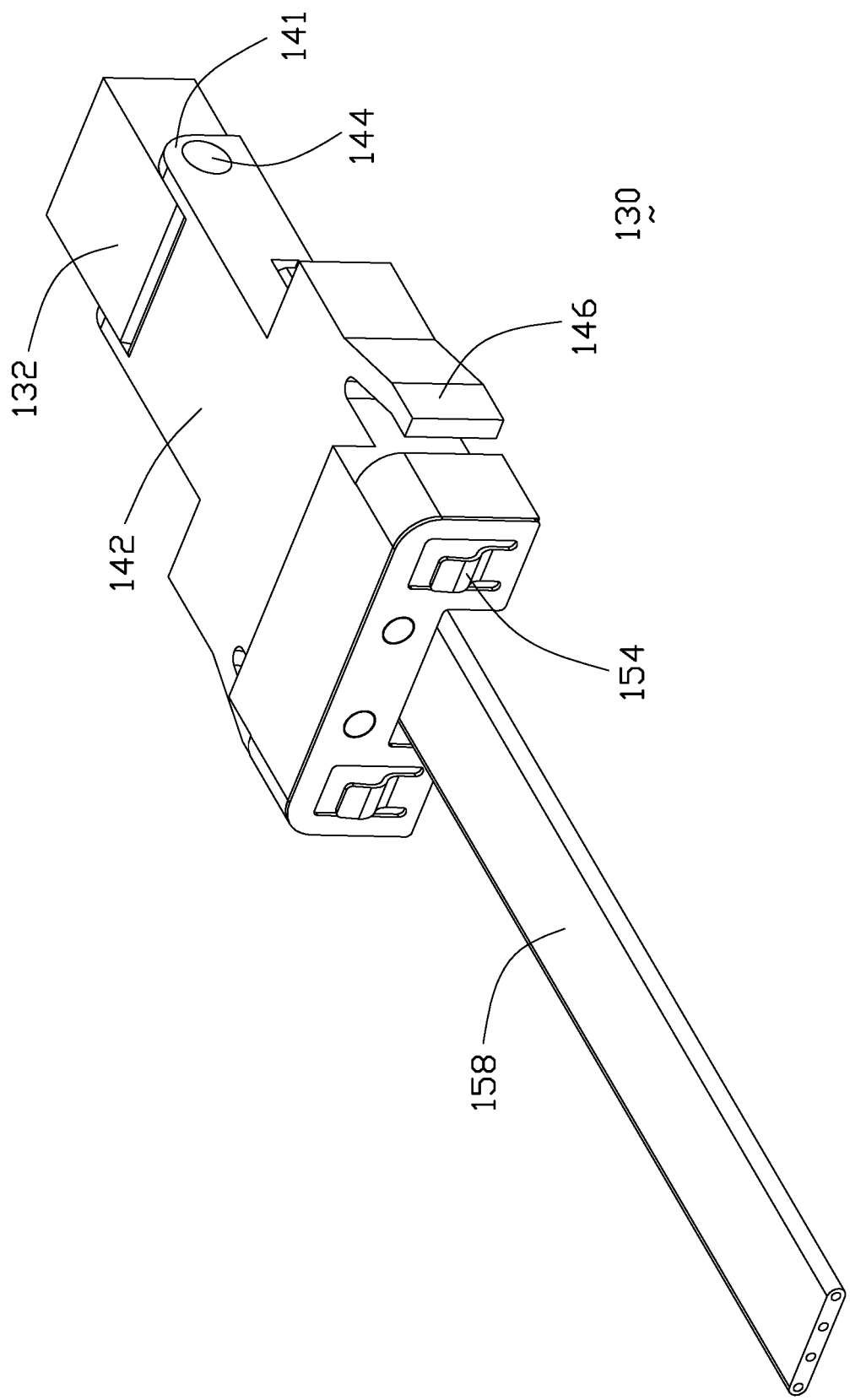
FIG. 16 is a rear perspective view of the optical fiber assembly of FIG. 12.
Figure 17:
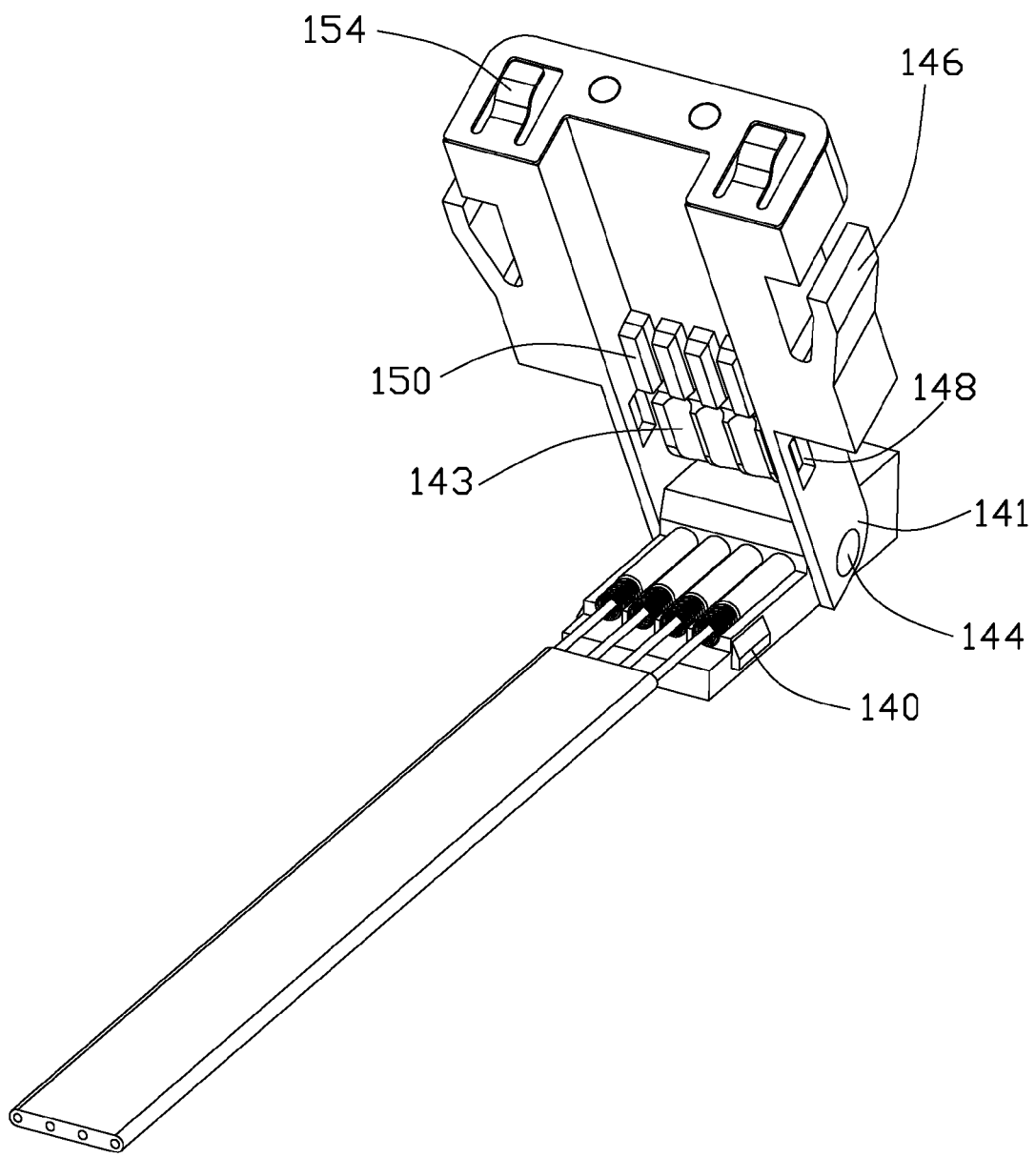
FIG. 17 is a rear perspective view of the optical fiber assembly of FIG. 12 with the cap is pivotally opened.
Figure 18:
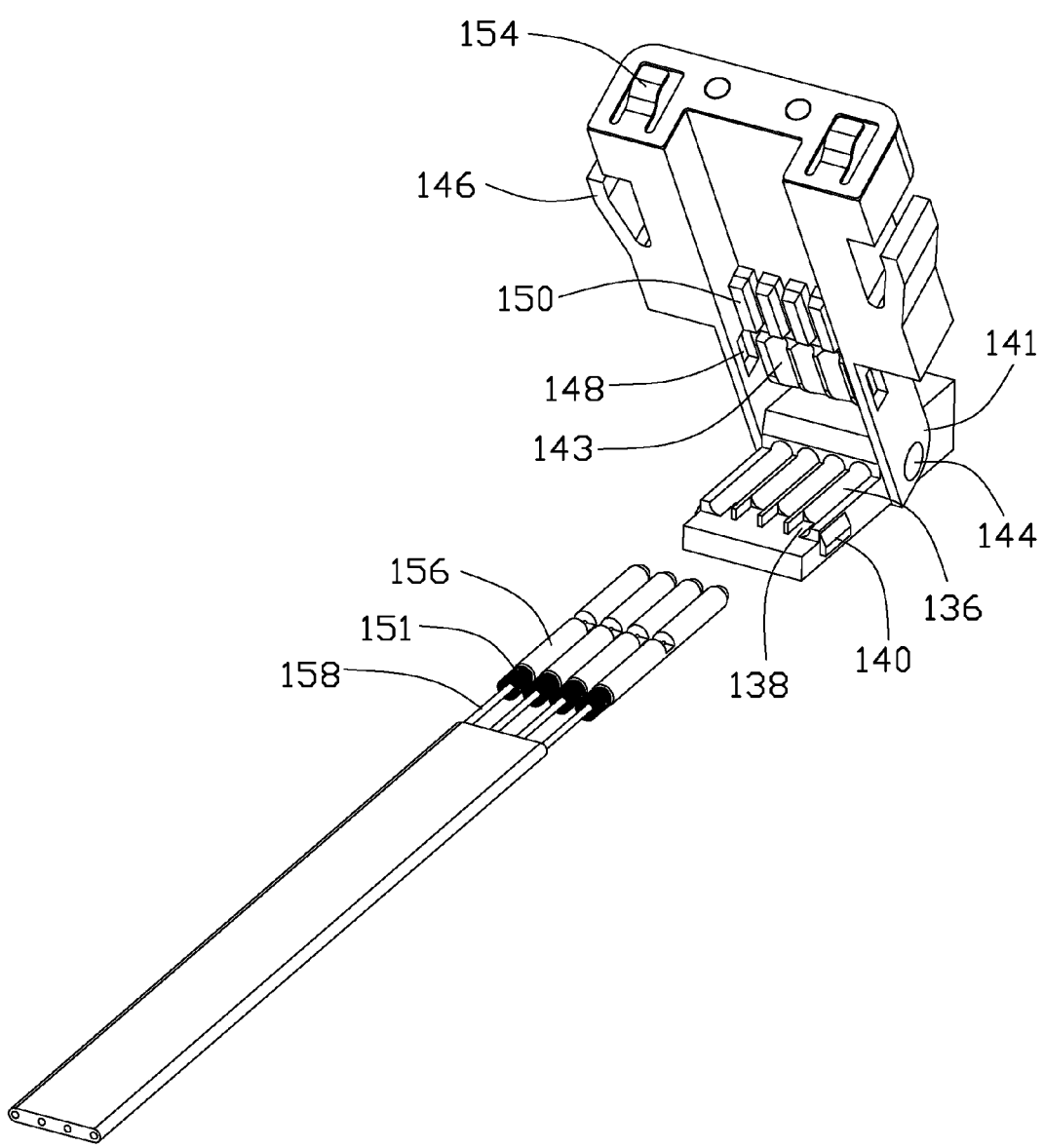
FIG. 18 is a rear perspective view of the optical fiber assembly of FIG. 12 with the opened cap and detached fibers.
Figure 19:
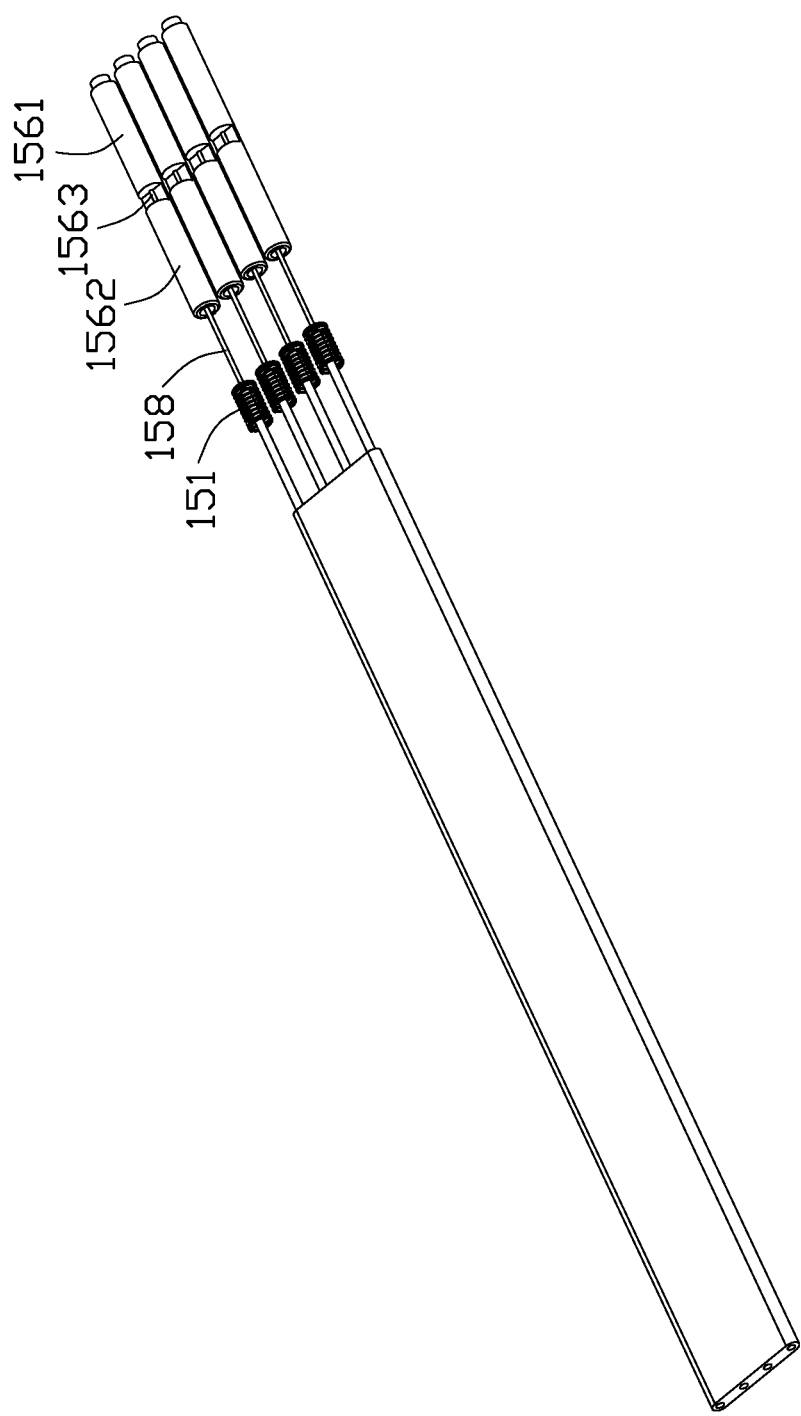
FIG. 19 is a rear perspective view of the detached fibers of FIG. 18.
Figure 20A:
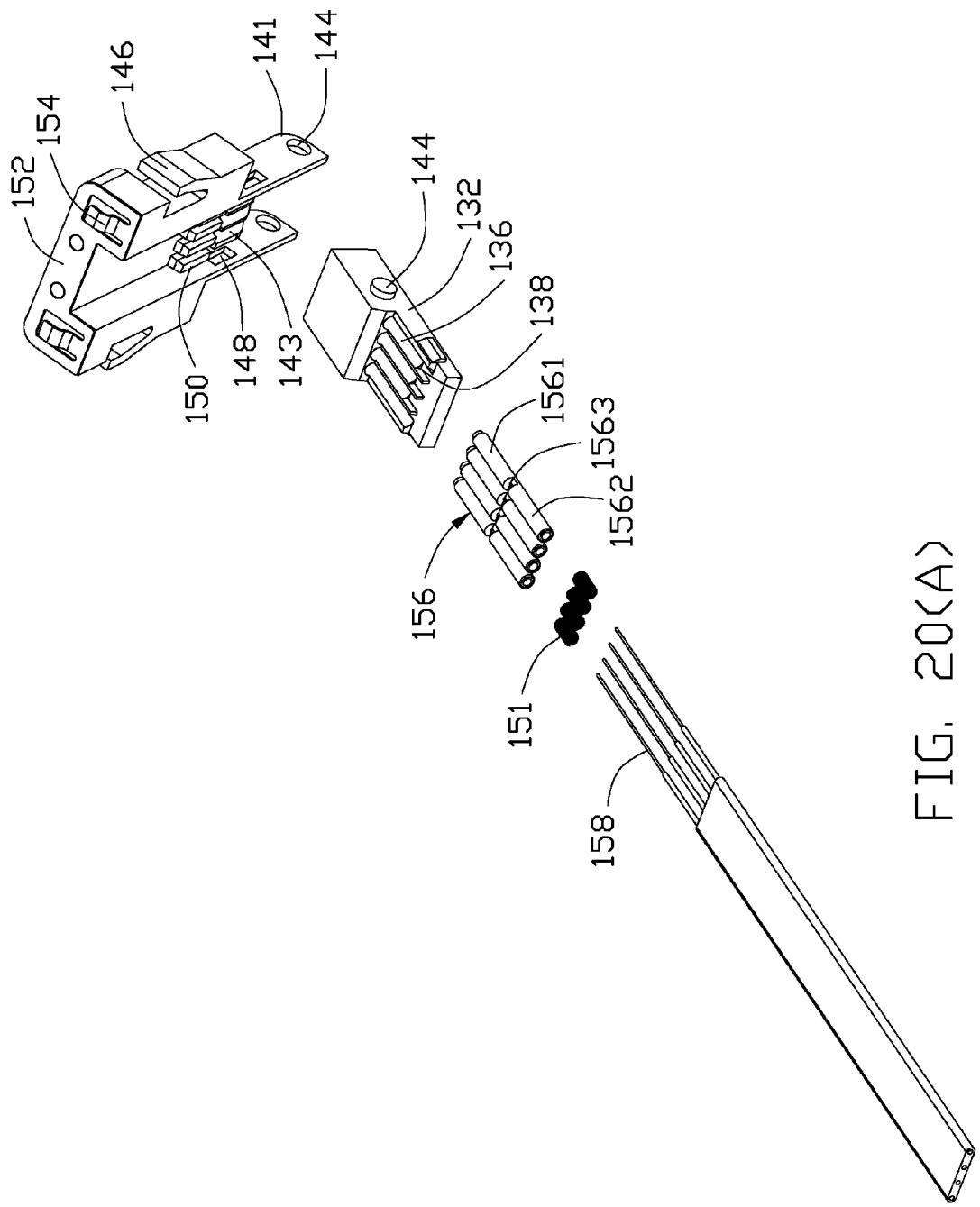
FIG. 20(A) is a rear exploded perspective view of the optical fiber assembly of FIG. 16.
Figure 20B:
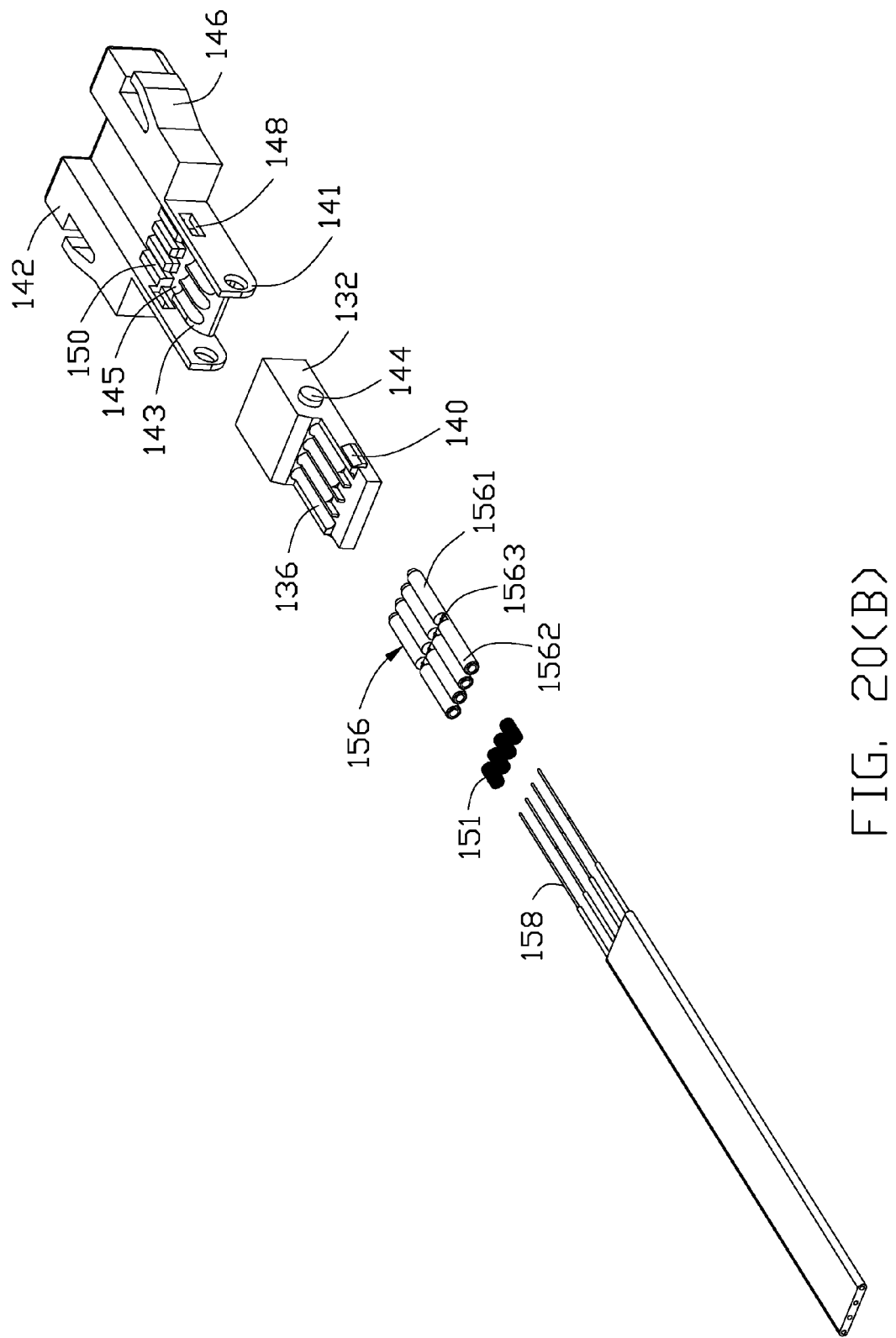
FIG. 20(B) is a rear exploded perspective view of the optical fiber assembly of FIG. 16 wherein the cap is fully upside-down exposed to an exterior.
Figure 20C:
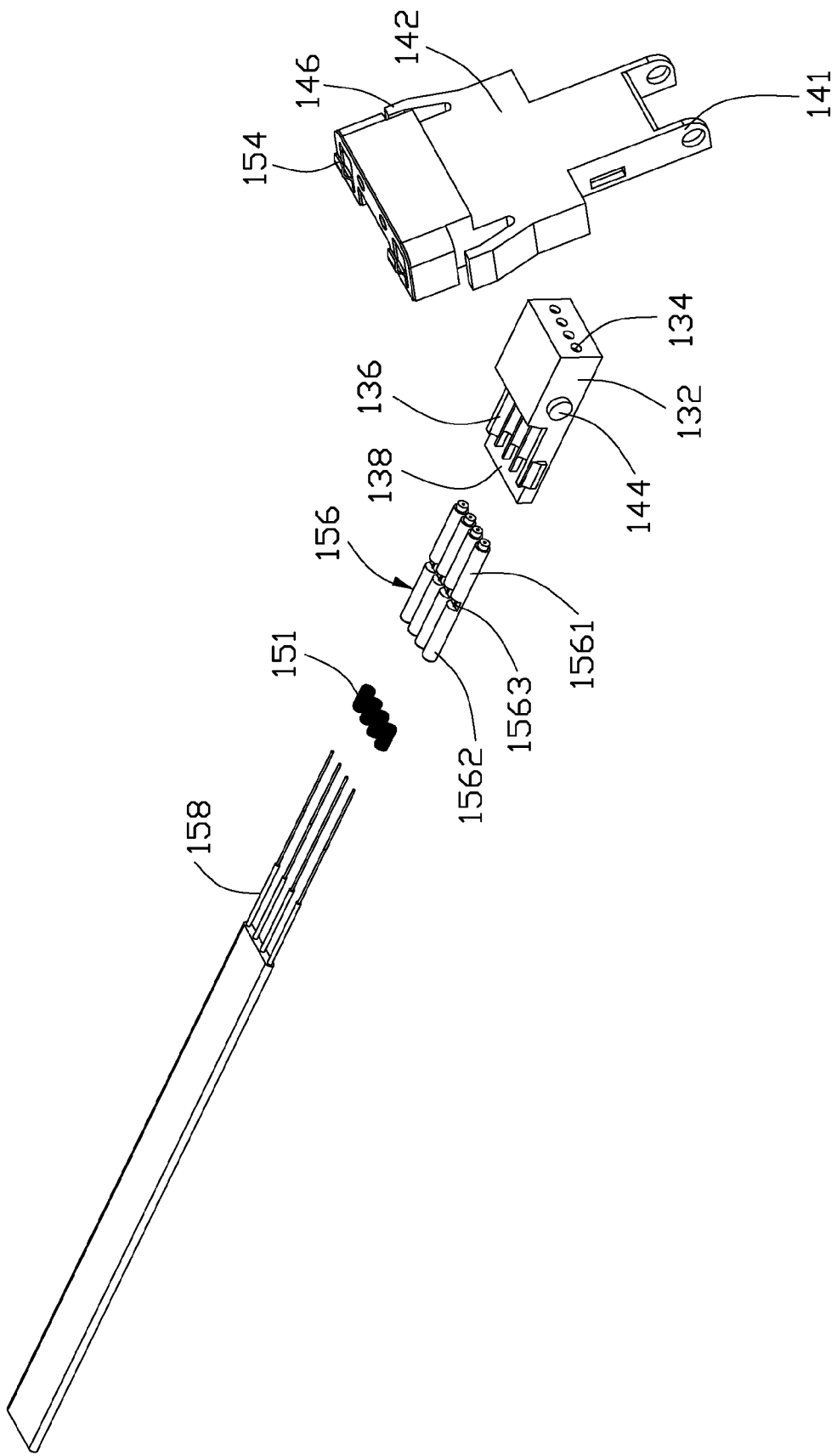
FIG. 20(C) is a front exploded perspective view of the optical fiber assembly of FIG. 16.
Figure 21:
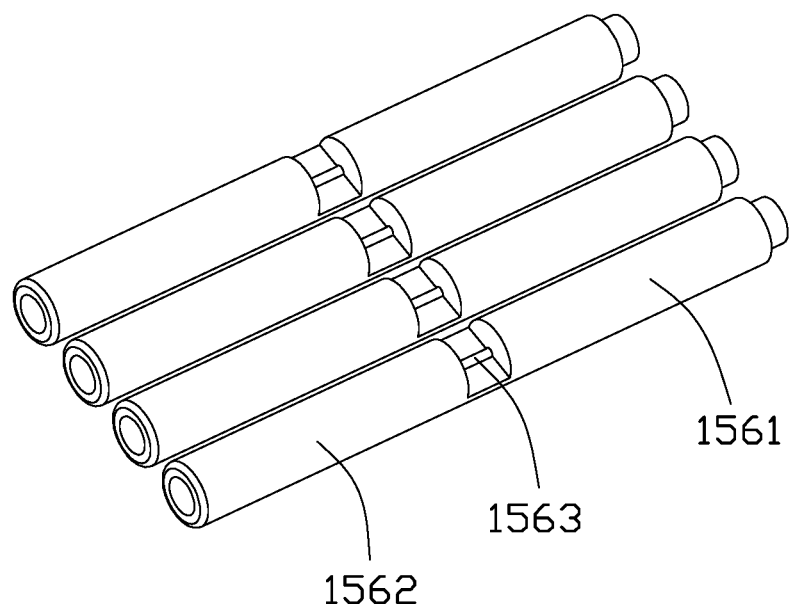
FIG. 21 is a rear perspective view of ferrule the optical fiber assembly of FIG. 16.
Figure 22:
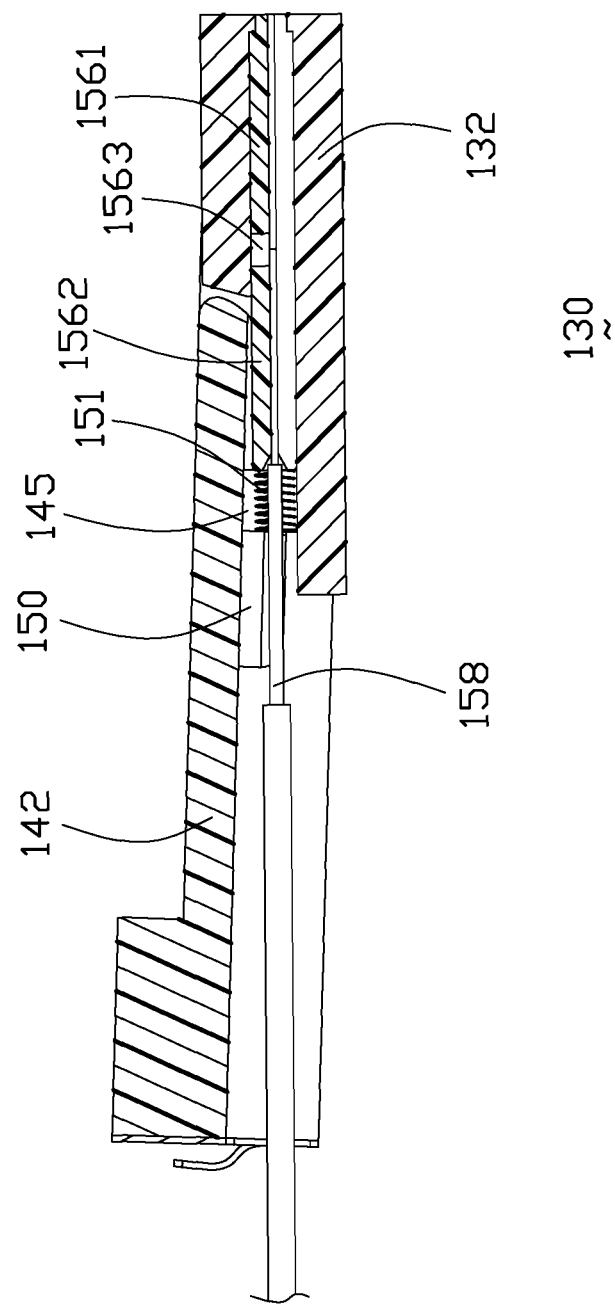
FIG. 22 is a cross-sectional view of the optical fiber assembly of FIG. 16 wherein the cap is slightly pivotally raised upward to show how the cap restrains the spring.

During assembling, the electrical assembly 60 is forwardly inserted into the receiving cavity 15 from a rear side of the housing 12 to have the corresponding terminals 64 exposed in the electrical mating port 16, and the optical fiber assembly 30 is forwardly inserted into the receiving cavity 15 from the rear side of the housing 12 to have the front end of the base block 32 slightly protruding out of the front face of the housing 12 so as to have the front tip of the optical fibers 58 exposed to an exterior in the front-to-back direction. At the same time, the deflectable latches 46 are locked within the corresponding locking opening 13 to prevent backward movement of the optical fiber assembly 30 in the receiving cavity 15. On the other hand, the kicker spring 54 rearwardly abuts against the retainer clip 70 so as to urge the whole optical fiber assembly 30 forwardly. Understandably, the base block 32 and the associated cap 42 are adapted to be back and forth slightly moveable along the front-to-back direction due to the kicker spring 54, thus resulting in buffering thereof. Notably, as shown in FIG. 11, the housing 12 forms a pair of steps 17 rearwardly abutting against the corresponding edge of the side arm 41 of the cap 42 so as to restrict further forward movement of the optical fiber assembly 30 with regard to the housing 12. Therefore, the optical fiber assembly 30 is allowed to be slightly back and forth moveable along the front-to-back direction in the housing 12 during coupling to the corresponding complementary connector.

Referring to FIGS. 12-27, the plug connector 110 of the second embodiment includes the similar basic structure with the first embodiment disclosed in FIGS. 1-11 except the additional individual springs are provided for the optical fibers, respectively, for enhancing the respect buffering effect during mating. The plug connector 110 includes an insulative housing 112 forming an optical mating port 114 and an electrical mating port 16 stacked with each other in a vertical direction. A receiving cavity 115 is formed in the housing 112 and communicates with the optical mating port 114 and the electrical mating port 116. A resilient latch 118 is unitarily formed on the housing 112 beside the optical mating port 114 and opposite to the electrical mating port 16 in the vertical direction. A plurality of passageways 120 extending along a front-to-back direction, are formed in the housing 112 around the electrical mating port 16. The contour of the housing 112 is compliant with the RJ-45 receptacle connector.

An optical fiber assembly 130 includes a base block 132 forming a plurality of through hole 134 extending along the front-to-back direction therein and a plurality of upward grooves 136 located behind and communicatively aligned with the corresponding through holes 134. A plurality of spring receiving slots 138 are located behind and aligned with the corresponding grooves 136 along the front-to-back direction, respectively, for receiving the lower parts of the corresponding coil springs 151 which are associated with the optical fibers 158 illustrate later. A pair of locking pegs 140 are formed on two opposite lateral sides of the base block 132. A cap 142 is pivotally mounted to the base block 132 and rotatable about the pivotal axis 144. A pair of deflectable latches 146 are formed on two opposite lateral sides of the cap 142 for locking into the corresponding locking openings 113 in the housing 112. A pair of locking holes 148 are formed within two opposite lateral sides for engagement with the locking pegs 140 of the base block 132. A plurality of downward grooves 143 are formed in an undersurface of the cap 132 and aligned with the corresponding upward grooves 136 so as to cooperate with each other to sandwich the corresponding ferrules 156 therebetween (illustrated later). A plurality of partitions 150 are formed behind the downward grooves 143 to provide not only the stopper forwardly abutting against rear ends of the corresponding coil springs 151 but also the space through which the corresponding optical fibers 158 extend, respectively. Notably, a space 145 is formed between the grooves 143 and the partitions 150 in the front-to-back direction for receiving the upper parts of the corresponding coil springs 151. A metallic plate 152 is attached to a rear end face of the cap 42 with a pair of kicker springs 154 thereon.

Figure 23:
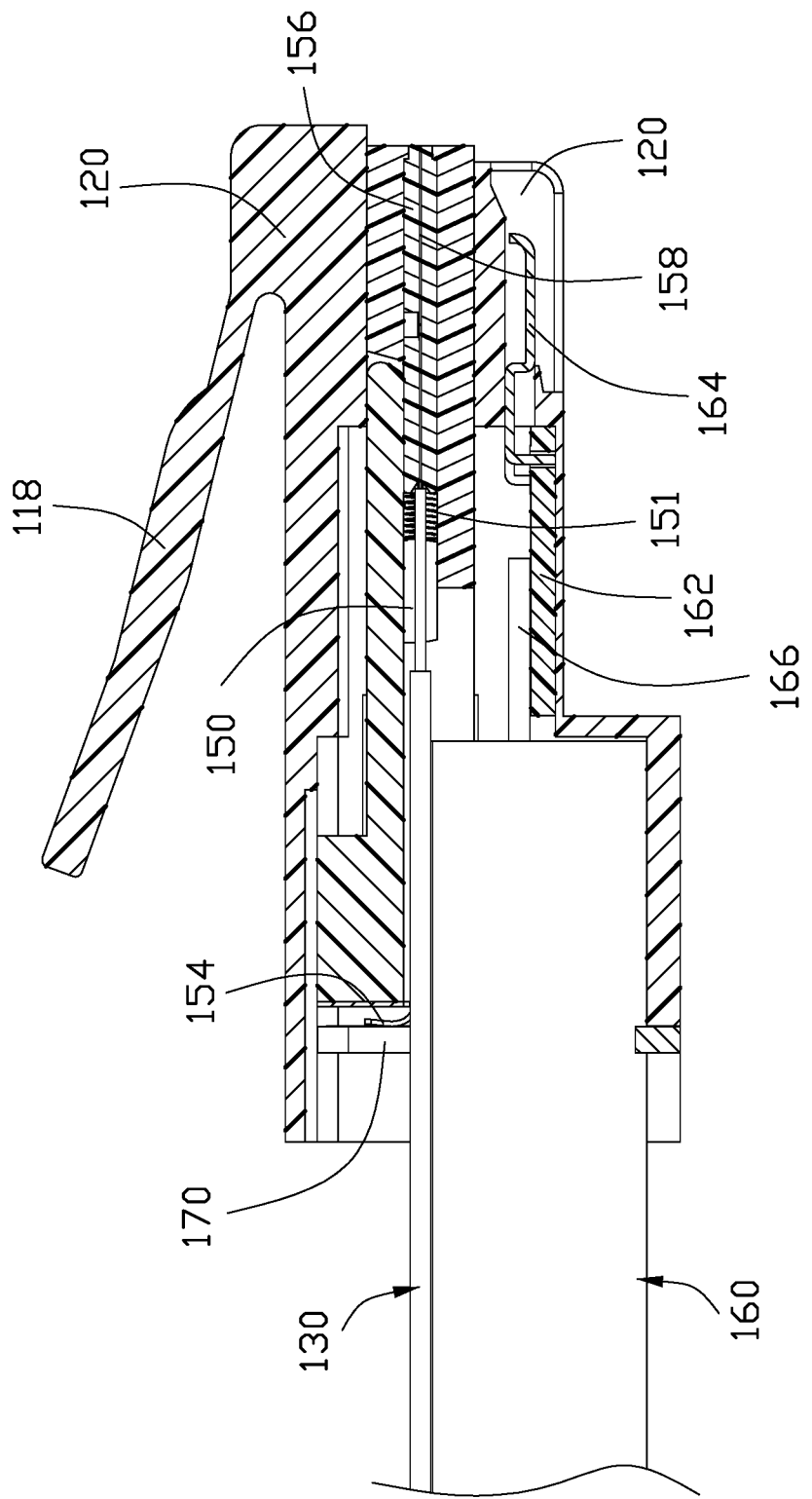
FIG. 23 is a vertical cross-sectional view of the plug connector of FIG. 12.
Figure 24:
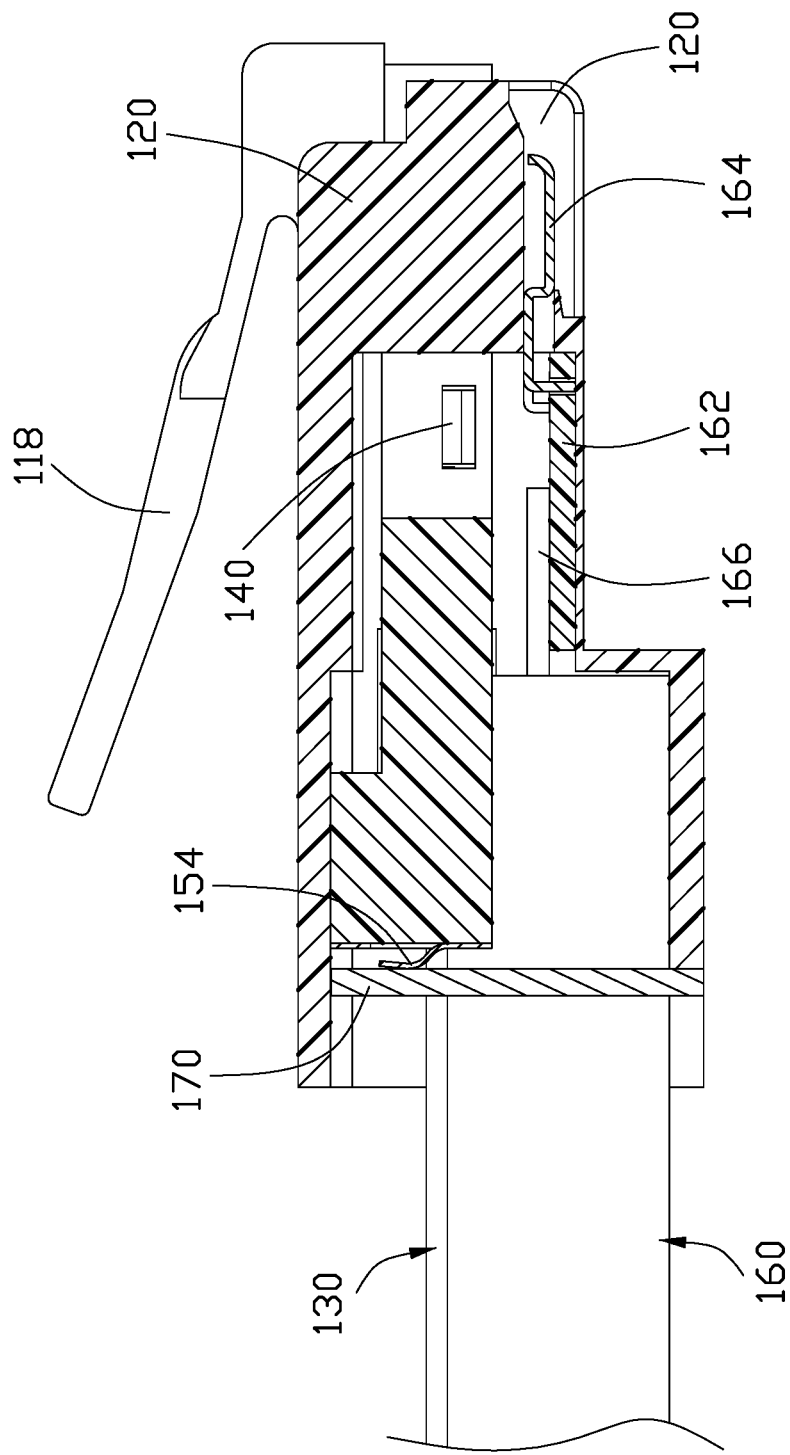
FIG. 24 is another vertical cross-sectional view of the plug connector of FIG. 12.
Figure 25:
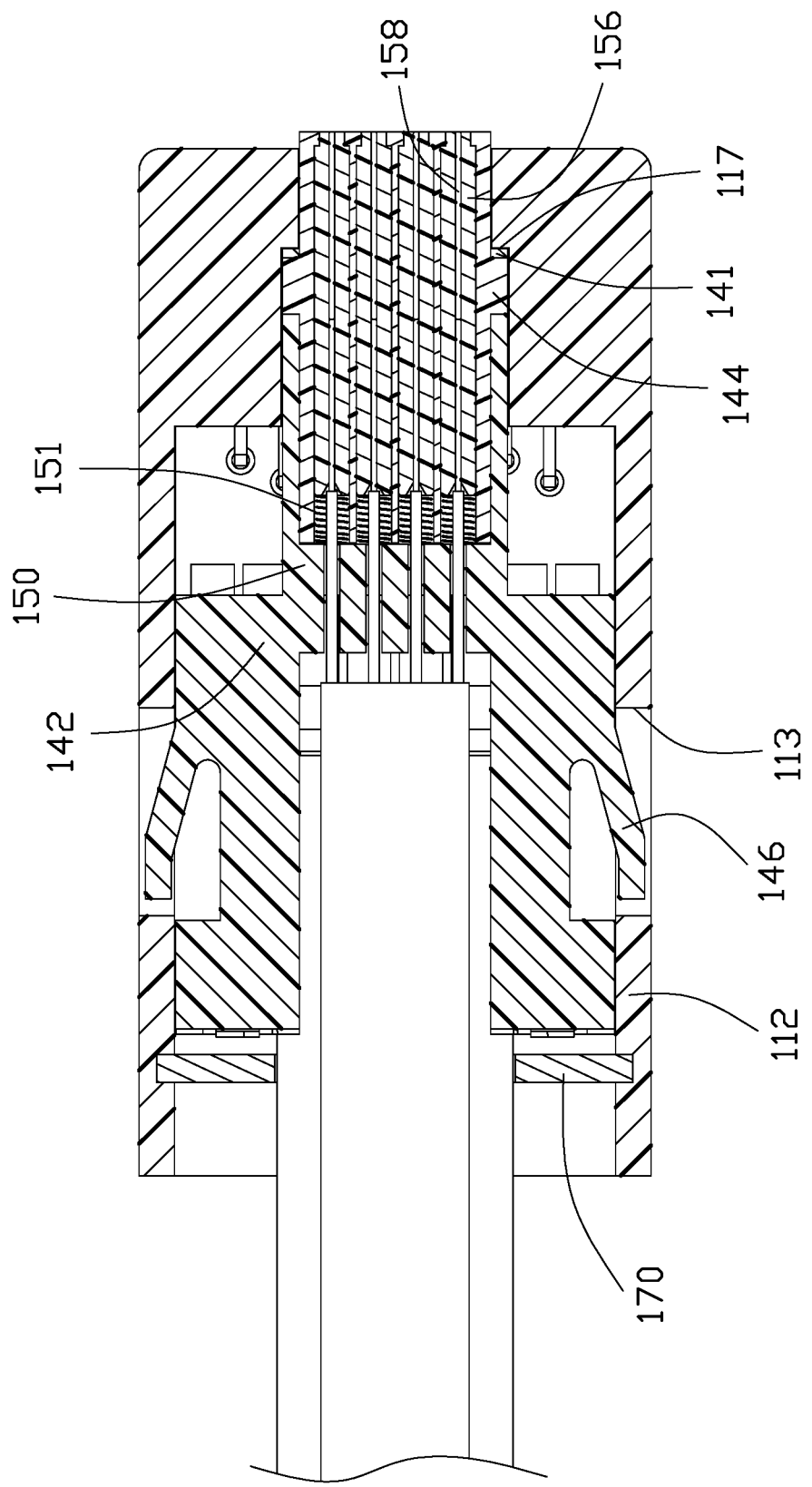
FIG. 25 is a horizontal cross-sectional view of the plug connector of FIG. 12.
Figure 26:
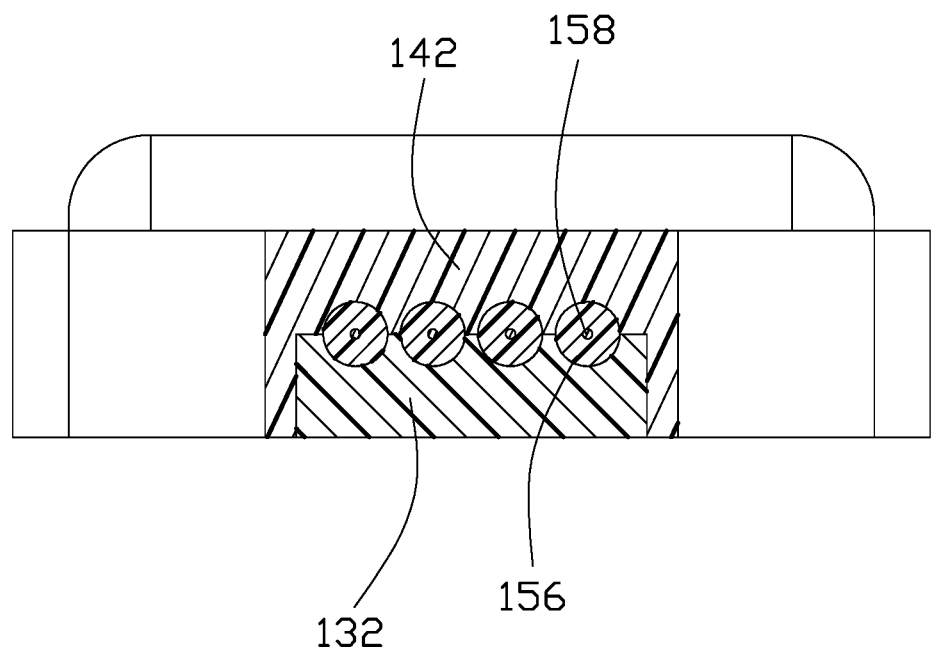
FIG. 26 is a vertical cross-sectional view of the plug connector of FIG. 12 to show how the ferrule is sandwiched between the cap and the base block.
Figure 27:
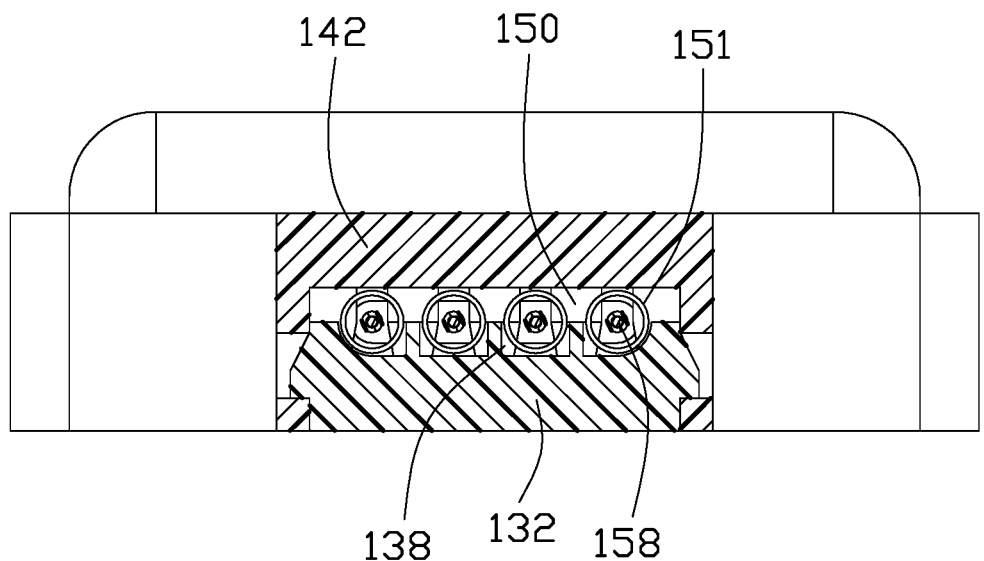
FIG. 27 is another vertical cross-sectional view of the plug connector of FIG. 12 to show how the coil springs are retained between the cap and the base block.

A plurality of ferrules 156 are side by side arranged with one another in a transverse direction wherein each ferrule 156 has a front half portion 1561 received within the corresponding through hole 134 while a rear half portion 1562 received within the corresponding groove 136 wherein a cutout 1563 is formed between the front half portion 1561 and the rear half 1562 for gluing the corresponding optical fiber 158 (illustrated later). Notably, as shown in FIGS. 23 and 25, a shoulder structure is formed at a front end portion of each through hole 134 to comply with the similar structure formed on a tip portion of the corresponding ferrule 156 so as to prevent forward movement of the ferrule 156. On the other hand, the rear end of each ferrule 156 abuts rearwardly against the front end of the coil spring 151 and the rear end of the coil spring 151 abuts against the partitions 150 of the cap 142 in the front-to-back direction so as to prevent rearward movement of the ferrule 156. Therefore, the ferrule 156 is retained in the base block 132 in position with a slight relative movement therebetween in the front-to-back direction due to the coil spring 151. A plurality of optical fibers 158 is inserted through the corresponding coil spring 151 and into the corresponding ferrules 156, respectively, and further fixed thereto, via glues in the cutout 1563, without relative movement therebetween in the front-to-back direction wherein the front tip of the optical fiber 158 is essentially flush with a front tip of the corresponding ferrule 156.

An electrical assembly 160 is located below the optical fiber assembly 130 in the vertical direction and includes a printed circuit board 162 with a plurality of terminals 164 connected to a front region and a plurality of wires 166 connected to the rear region. A retaining clip 170 is adapted to be inserted into a corresponding slot 168 in the housing 112 along the vertical direction.

During assembling, the electrical assembly 160 is forwardly inserted into the receiving cavity 115 from a rear side of the housing 112 to have the corresponding terminals 164 exposed in the electrical mating port 116, and the optical fiber assembly 130 is forwardly inserted into the receiving cavity 115 from the rear side of the housing 112 to have the front end of the base block 132 slightly protruding out of the front face of the housing 112 so as to have the front tip of the optical fibers 158 exposed to an exterior in the front-to-back direction. At the same time, the deflectable latches 146 are locked within the corresponding locking opening 113 to prevent backward movement of the optical fiber assembly 30 in the receiving cavity 115. On the other hand, the kicker spring 154 rearwardly abuts against the retainer clip 170 so as to urge the whole optical fiber assembly 30 forwardly. Understandably, the base block 132 and the associated cap 142 are adapted to be back and forth slightly moveable along the front-to-back direction due to the kicker spring 154, thus resulting in buffering thereof. Notably, as shown in FIG. 25, the housing 112 forms a pair of steps 117 rearwardly abutting against the corresponding edge of the side arm 141 of the cap 142 so as to restrict further forward movement of the optical fiber assembly 130 with regard to the housing 112. Therefore, the optical fiber assembly 130 is allowed to be slightly back and forth moveable along the front-to-back direction in and with regard to the housing 112 due to the kicker spring 154 during coupling to the corresponding complementary connector. Anyhow, as mentioned before, the optical fibers 158 may further slightly back and forth moveable relative to the base block 132 and the cap 142 due to the individual spring 151. In brief, in the second embodiment, there are two buffering effects for the optical fiber assembly 130 during coupling to the corresponding receptacle connector.

What is claimed is:

1. A hybrid plug connector comprising:
an insulative housing forming a cavity extending through a front face thereof to forwardly communicate with an exterior in a front-to-back direction;
a plurality of passageways formed in the housing and spaced from the cavity in a vertical direction perpendicular to said front-to-back direction;
an electrical cable assembly received within the cavity and including a plurality of terminals electrically connected to a cable, a contacting section of each of the terminals extending into the corresponding passageway and communicating with the exterior in the vertical direction;
an optical fiber assembly received within the cavity; and
a deflectable latch formed upon the housing opposite to the terminals;
wherein the optical fiber assembly is essentially located at a middle level between the latch and the terminals in the vertical direction, and said optical fiber assembly is equipped with a buffering device to be slightly back and forth moveable relative to the housing in the front-to-back direction.

2. The hybrid plug connector as claimed in claim 1, wherein said electrical assembly further includes a printed circuit board on which the terminals are mounted, and the terminals are electrically connected to the cable through said printed circuit board.

3. The hybrid plug connector as claimed in claim 1, wherein the optical fiber assembly includes a plurality of optical fibers associated with and retained to a plurality of ferrules, respectively.

4. The hybrid plug connector as claimed in claim 3, wherein said optical fiber assembly includes a base block and a cap pivotally mounted on the base block, and one of said cap and said base block includes said buffering device.

5. The hybrid plug connector as claimed in claim 4, wherein a vertical dimension of the base block is not less than one fifth of a vertical dimension of the insulative housing in said vertical direction.

6. The hybrid plug connector as claimed in claim 5, wherein each of said optical fibers and the corresponding ferrule is equipped with a coil spring to be said buffering device.

7. The hybrid plug connector as claimed in claim 6, wherein the base block forms a plurality of through holes extending along the front-to-back direction and a plurality of upward grooves located behind and communicatively aligned with the corresponding through holes, the cap including a plurality of downward grooves formed in an undersurface thereof and aligned with the corresponding upward grooves so as to cooperate with each other to sandwich the corresponding ferrules therebetween.

8. The hybrid plug connector as claimed in claim 7, wherein the optical fiber assembly forms a plurality of spring receiving slots located behind and aligned with the corresponding upward grooves along the front-to-back direction, respectively, for receiving the lower parts of the corresponding coil springs.

9. The hybrid plug connector as claimed in claim 7, wherein the cap forms a plurality of partitions located behind the downward grooves to provide the stopper forwardly abutting against rear ends of the corresponding coil springs.

10. The hybrid plug connector as claimed in claim 4, wherein the optical fiber assembly includes a metallic plate attached to a rear end face of the cap with a pair of kicker springs thereon.

11. The hybrid plug connector as claimed in claim 10, further comprising a retaining clip adapted to be inserted into a corresponding slot in the housing along the vertical direction.

12. The hybrid plug connector as claimed in claim 11, wherein the kicker spring rearwardly abuts against the retainer clip so as to urge the whole optical fiber assembly forwardly.

13. The hybrid plug connector as claimed in claim 4, wherein the housing forms a pair of steps rearwardly abutting against the corresponding edge of the side arm of the cap so as to restrict further forward movement of the optical fiber assembly with regard to the housing.

14. A hybrid plug connector comprising:
an insulative housing forming a cavity extending through a front face thereof to forwardly communicate with an exterior in a front-to-back direction;
a plurality of passageways formed in the housing and spaced from the cavity in a vertical direction perpendicular to said front-to-back direction;
an electrical assembly received within the cavity and including a plurality of terminals electrically connected to a cable, a contacting section of each of the terminals extending into the corresponding passageway and communicating with the exterior in the vertical direction;
an optical fiber assembly received within the cavity; and
a deflectable latch formed upon the housing opposite to the terminals;
wherein said optical fiber assembly is equipped with a buffering device to be slightly back and forth moveable relative to the housing in the front-to-back direction, and said optical fiber assembly includes a base block holding a plurality of optical fibers therein and extending forwardly through said cavity with a front face forwardly exposed to said exterior.

15. The hybrid plug connector as claimed in claim 14, wherein said front face of the base block is rearwardly offset from another front face formed on the deflectable latch.

16. The hybrid plug connector as claimed in claim 15, wherein said optical fiber assembly further including a cap pivotally mounted upon the base block to cooperate with the base block for holding the corresponding optical fibers therein.

17. The hybrid plug connector as claimed in claim 15, wherein the optical fiber assembly is equipped with at least one releasable latch engaged with the housing for retaining said optical fiber assembly to the housing.

18. A hybrid plug connector comprising:
an insulative housing forming a cavity extending through a front surface thereof to forwardly communicate with an exterior in a front-to-back direction;
a plurality of passageways formed in the housing and spaced from the cavity in a vertical direction perpendicular to said front-to-back direction;
an electrical assembly received within the cavity and including a plurality of terminals electrically connected to a cable, a contacting section of each of the terminals extending into the corresponding passageway and communicating with the exterior in the vertical direction;
an optical fiber assembly received within the cavity; and
a deflectable latch formed upon the housing opposite to the terminals;
wherein said optical fiber assembly includes a base block holding a plurality of optical fibers therein and extending forwardly through said cavity with thereof a front face forwardly exposed to said exterior;
wherein the front face of the base block is rearwardly offset from another front surface of the housing where a root of the deflectable latch is adjacent to along the front-to-back direction.

19. The hybrid plug connector as claimed in claim 18, wherein said optical fiber assembly further includes a cap pivotally mounted upon said base block, and said base block and said cap form a plurality of grooves each receiving a half of one ferrule in which one corresponding optical fiber is disposed.

20. The hybrid plug connector as claimed in claim 18, wherein said front face of the base block is forwardly offset from the front surface of the housing where the passageways extend therethrough in the front-to-back direction.

* * * * *